United States Patent
Lankalapalli et al.

(10) Patent No.: US 10,895,445 B2
(45) Date of Patent: Jan. 19, 2021

(54) ARTICULATED ARM COORDINATE MEASURING MACHINES WITH ACTIVE COUNTERBALANCE

(71) Applicant: FARO Technologies, Inc., Lake Mary, FL (US)

(72) Inventors: Kishore Lankalapalli, Sanford, FL (US); Yue Li, Lake Mary, FL (US); John Lucas Creachbaum, Deltona, FL (US); Dragos M. Stanescu, Lake Mary, FL (US); Paul C. Atwell, Lake Mary, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 235 days.

(21) Appl. No.: 16/131,314

(22) Filed: Sep. 14, 2018

(65) Prior Publication Data
US 2020/0088505 A1 Mar. 19, 2020

(51) Int. Cl.
*G01B 5/008* (2006.01)
*B25J 9/12* (2006.01)
*B25J 13/02* (2006.01)

(52) U.S. Cl.
CPC .............. *G01B 5/008* (2013.01); *B25J 9/126* (2013.01); *B25J 13/02* (2013.01)

(58) Field of Classification Search
CPC ............................. G01B 5/008; G01B 11/005
USPC ......................................... 33/503, 1 N, 1 PT
See application file for complete search history.

(56) References Cited

U.S. PATENT DOCUMENTS

| | | |
|---|---|---|
| 5,402,582 A | 4/1995 | Raab |
| 5,611,147 A | 3/1997 | Raab |
| 5,724,264 A | 3/1998 | Rosenberg et al. |
| 6,134,506 A | 10/2000 | Rosenberg et al. |
| 7,591,078 B2 | 9/2009 | Crampton |
| 8,340,820 B2 | 12/2012 | Nair |
| 8,705,012 B2 | 4/2014 | Greiner et al. |

(Continued)

FOREIGN PATENT DOCUMENTS

| | | |
|---|---|---|
| EP | 3121472 A1 | 1/2017 |
| WO | 2018055752 A1 | 3/2018 |

OTHER PUBLICATIONS

"File:FlarmonicDriveAni.gif", Wikipedia, Retrieved from the Internet Sep. 14, 2018: [https://en.wikipedia.org/wiki/File:HarmonicDriveAni.gif] Published Dec. 5, 2016; 6 pages.

(Continued)

*Primary Examiner* — Christopher W Fulton
(74) *Attorney, Agent, or Firm* — Cantor Colburn LLP

(57) ABSTRACT

Rotary assemblies for arm segments of an articulated arm coordinate measuring machines are provided. The rotary assemblies include a drive assembly having an output shaft passing therethrough. The drive assembly includes a motor subassembly and an output subassembly having a gear assembly and a shaft engagement element. The motor subassembly is configured to drive the gear assembly and the shaft engagement element to drive the output shaft. In some embodiments, a motor controller is operably coupled to the motor subassembly. The motor assembly provides a torque on an arm segment about a second axis in response to a signal from the motor controller.

30 Claims, 18 Drawing Sheets

(56) References Cited

U.S. PATENT DOCUMENTS

| | | | |
|---|---|---|---|
| 8,763,267 B2* | 7/2014 | Duportal | G01B 5/008 |
| | | | 33/503 |
| 9,423,282 B2* | 8/2016 | Moy | G01D 18/008 |
| 9,734,609 B2 | 8/2017 | Pulla et al. | |
| 9,964,398 B2 | 5/2018 | Becker et al. | |
| 9,964,402 B2* | 5/2018 | Tohme | H04N 13/239 |
| 10,036,627 B2* | 7/2018 | Ferrari | G01B 21/04 |
| 10,126,109 B2 | 11/2018 | Tait | |
| 10,144,125 B2 | 12/2018 | Su et al. | |
| 2005/0150123 A1 | 7/2005 | Eaton | |
| 2009/0000136 A1* | 1/2009 | Crampton | B25J 13/088 |
| | | | 33/503 |
| 2010/0188034 A1 | 7/2010 | Young et al. | |
| 2011/0067517 A1 | 3/2011 | Ihrke et al. | |
| 2011/0107611 A1* | 5/2011 | Desforges | B25J 13/02 |
| | | | 33/502 |
| 2011/0173825 A1* | 7/2011 | Danielson | G01B 11/007 |
| | | | 33/503 |
| 2011/0192043 A1* | 8/2011 | Ferrari | G01B 5/012 |
| | | | 33/503 |
| 2012/0279338 A1 | 11/2012 | Ihrke et al. | |
| 2015/0276436 A1 | 10/2015 | Hasebe et al. | |
| 2017/0028557 A1 | 2/2017 | Battisti | |
| 2018/0095174 A1 | 4/2018 | Mertz | |
| 2018/0216923 A1 | 8/2018 | Creachbaum et al. | |
| 2018/0299243 A1* | 10/2018 | Sajedi | G01B 5/008 |
| 2020/0081412 A1* | 3/2020 | Raab | G01B 11/007 |

OTHER PUBLICATIONS

Bradley, Michael "Robotic arm joint", YouTube Video, Retrieved via internet Sep. 14, 2018 [https://www.youtube.com/watch?v=Z1tBqWnBKZY] Published Sep. 3, 2013; 2 pages.

"Agilent 4-axis Direct Drive Robot", Youtube video by j0ndrums, available at: https://www.youtube.com/watch?v=q8iVuyYsnng, accessed Apr. 13, 2018; 2 pages.

"EMS Benelux supplier from Wenzel Mobilescan 3d scanner", Youtube video by wenzelbenelux, published on May 18, 2011, available at: https://www.youtube.com/watch?v=hf7xTv48sMU, accessed Apr. 20, 2018; 2 pages.

"The Mobile CNC Measurement and 3D Scanning System", WENZEL Scantec, Oct. 2010; 8 pages.

"UCC2 universal CMM controller", RENISHAW, Installation Guide, 2008 (86 pages).

European Search Report for European Application No. 19196394.1, International Filing Date Sep. 10, 2019, dated Feb. 7, 2020, 7 pages.

* cited by examiner

ARTICULATED ARM COORDINATE MEASURING MACHINES WITH ACTIVE COUNTERBALANCE

BACKGROUND

The present disclosure relates to coordinate measuring systems, and in particular to articulated arm coordinate measuring machines for precision metrology and other coordinate measuring systems having active counterbalance.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive, and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ('582), which is incorporated herein by reference in its entirety. The '582 patent discloses a 3-D measuring system comprised of a manually-operated AACMM having a support base on one end and a measurement probe at the other end. Commonly assigned U.S. Pat. No. 5,611,147 ('147), which is incorporated herein by reference in its entirety, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

Relative rotational movement between the arm segments of the AACMM typically involves rotary devices and assemblies having a pair of bearings and an angular encoder. Accordingly, while existing methods of manufacturing AACMM's are suitable for their intended purposes the need for improvement remains, particularly in providing improved measurement and scanning techniques.

BRIEF DESCRIPTION

According to some aspects of the present disclosure, rotary assemblies for arm segments of articulated arm coordinate measuring machines are provided. The rotary assemblies include a drive assembly having an output shaft passing therethrough. The drive assembly includes a motor subassembly and an output subassembly having a gear assembly and a shaft engagement element. The motor subassembly is configured to drive the gear assembly and the shaft engagement element to drive the output shaft.

In addition to one or more of the features described above, or as an alternative, further embodiments of the rotary assemblies may include that the motor subassembly includes a stator and a rotor.

In addition to one or more of the features described above, or as an alternative, further embodiments of the rotary assemblies may include that the gear assembly comprises a strain wave gear set.

In addition to one or more of the features described above, or as an alternative, further embodiments of the rotary assemblies may include that the strain wave gear set includes a wave generator, a flex spline, and a circular spline.

In addition to one or more of the features described above, or as an alternative, further embodiments of the rotary assemblies may include that the flex spline operably connects to the shaft engagement element.

In addition to one or more of the features described above, or as an alternative, further embodiments of the rotary assemblies may include that the shaft engagement element is integrally formed with the output shaft.

In addition to one or more of the features described above, or as an alternative, further embodiments of the rotary assemblies may include that the shaft engagement element is fixed connected to the output shaft.

In addition to one or more of the features described above, or as an alternative, further embodiments of the rotary assemblies may include that the shaft engagement element is an elastic element.

In addition to one or more of the features described above, or as an alternative, further embodiments of the rotary assemblies may include that the output shaft is an elastic element.

In addition to one or more of the features described above, or as an alternative, further embodiments of the rotary assemblies may include an output encoder element within the output subassembly and arranged to monitor at least one of position and rotation of at least one of the shaft engagement element and the output shaft.

In addition to one or more of the features described above, or as an alternative, further embodiments of the rotary assemblies may include a motor encoder element within the motor subassembly and arranged to monitor at least one of position and rotation of a component of the motor subassembly.

In addition to one or more of the features described above, or as an alternative, further embodiments of the rotary assemblies may include that the output subassembly includes an output housing arranged to house the motor subassembly and the output shaft.

In addition to one or more of the features described above, or as an alternative, further embodiments of the rotary assemblies may include an elastic element operably positioned between the gear assembly and the output shaft.

In addition to one or more of the features described above, or as an alternative, further embodiments of the rotary assemblies may include that the gear assembly comprises a cycloidal drive.

According to some embodiments, articulated arm coordinate measuring systems are provided. The articulated arm coordinate measuring systems include a coordinate measuring device and a rotary assembly. The rotary assembly includes a drive assembly having an output shaft passing therethrough. The drive assembly includes a motor subassembly and an output subassembly having a gear assembly and a shaft engagement element. The motor subassembly is configured to drive the gear assembly and the shaft engagement element to drive the output shaft.

In addition to one or more of the features described above, or as an alternative, further embodiments of the articulated arm coordinate measuring systems may include that the gear assembly comprises a strain wave gear set.

In addition to one or more of the features described above, or as an alternative, further embodiments of the articulated arm coordinate measuring systems may include that the gear assembly comprises a cycloidal drive.

In addition to one or more of the features described above, or as an alternative, further embodiments of the articulated arm coordinate measuring systems may include a control unit operably connected to the motor subassembly and configured to control operation of the subassembly motor.

In addition to one or more of the features described above, or as an alternative, further embodiments of the articulated arm coordinate measuring systems may include that the control unit is configured to learn manual input to automatically control operation of the subassembly motor based on the learned manual input.

In addition to one or more of the features described above, or as an alternative, further embodiments of the articulated arm coordinate measuring systems may include that the coordinate measuring device is a laser line probe.

In addition to one or more of the features described above, or as an alternative, further embodiments of the articulated arm coordinate measuring systems may include that the coordinate measuring device is a rotatable platter.

In addition to one or more of the features described above, or as an alternative, further embodiments of the articulated arm coordinate measuring systems may include that the motorized rotary assembly is a first motorized rotary assembly, the system further comprising a second motorized rotary assembly.

In addition to one or more of the features described above, or as an alternative, further embodiments of the articulated arm coordinate measuring systems may include that the first motorized rotary assembly is arranged to drive movement of a first coordinate measuring device and the second motorized rotary assembly is arranged to drive movement of a second coordinate measuring device.

In addition to one or more of the features described above, or as an alternative, further embodiments of the articulated arm coordinate measuring systems may include at least one control unit operably connected to the first motorized rotary assembly and the second motorized rotary assembly, the at least one control unit configured to control operation of the first and second motorized rotary assemblies.

In addition to one or more of the features described above, or as an alternative, further embodiments of the articulated arm coordinate measuring systems may include that the at least one control unit is a single control unit operably connected to both the first motorized rotary assembly and the second motorized rotary assembly.

In addition to one or more of the features described above, or as an alternative, further embodiments of the articulated arm coordinate measuring systems may include that the first motorized rotary assembly includes a first control unit and the second motorized rotary assembly includes a second control unit.

According to some embodiments, articulated arm coordinate measuring systems are provided that include a base, an articulated arm having at least a first arm segment, the first arm segment being rotationally coupled about a first axis and a second axis to the base, and a coordinate measuring device coupled to an end of the articulated arm opposite the base. A rotary assembly is coupled to the second axis, and the rotary assembly includes a drive assembly having an output shaft passing therethrough. The drive assembly includes a motor subassembly and an output subassembly having a gear assembly and a shaft engagement element. The motor subassembly is configured to drive the gear assembly and the shaft engagement element to drive the output shaft and a motor controller operably coupled to the motor subassembly, wherein the motor assembly providing a torque on the first arm segment about the second axis in response to a signal from the motor controller.

In addition to one or more of the features described above, or as an alternative, further embodiments of the articulated arm coordinate measuring systems may include that the torque maintains the first arm segment at a first position when a user removes their hand from the articulated arm.

In addition to one or more of the features described above, or as an alternative, further embodiments of the articulated arm coordinate measuring systems may include that the motor controller is configured to reduce the torque in response to the application of an external force by an operator.

In addition to one or more of the features described above, or as an alternative, further embodiments of the articulated arm coordinate measuring systems may include that the motor controller is configured to increase the torque in response to the reduction of an external force by an operator.

In addition to one or more of the features described above, or as an alternative, further embodiments of the articulated arm coordinate measuring systems may include that the torque is based on a look up table.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

An embodiment of the present invention provides automated and/or motorized rotary assemblies for use with coordinate measuring systems. The motorized rotary assemblies integrate a motor into the rotary assembly to thus provide automation of movement of the coordinate measuring systems. Embodiments of the invention provide advantages in potentially eliminating manual operation of such coordinate measuring systems. Further, advantageously, by employing motorized rotary assemblies of the present disclosure, learning processes can be employed to teach the motorized rotary assemblies to control operation of coordinate measuring systems after manual input.

Figure 1A:
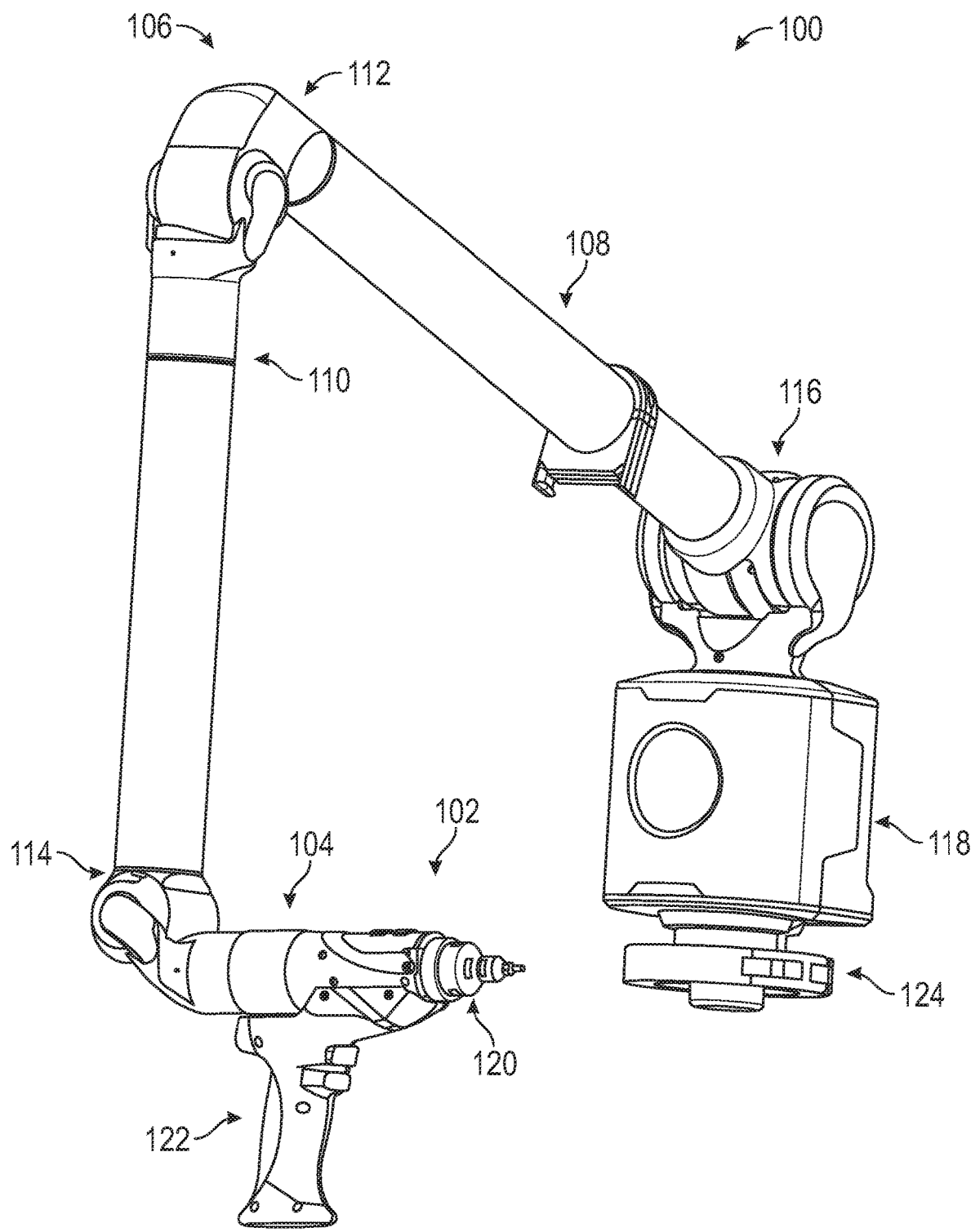
FIG. 1A is an isometric view of a portable articulated arm coordinate measuring machine (AACMM) that may incorporate embodiments of the present disclosure.
Figure 1B:
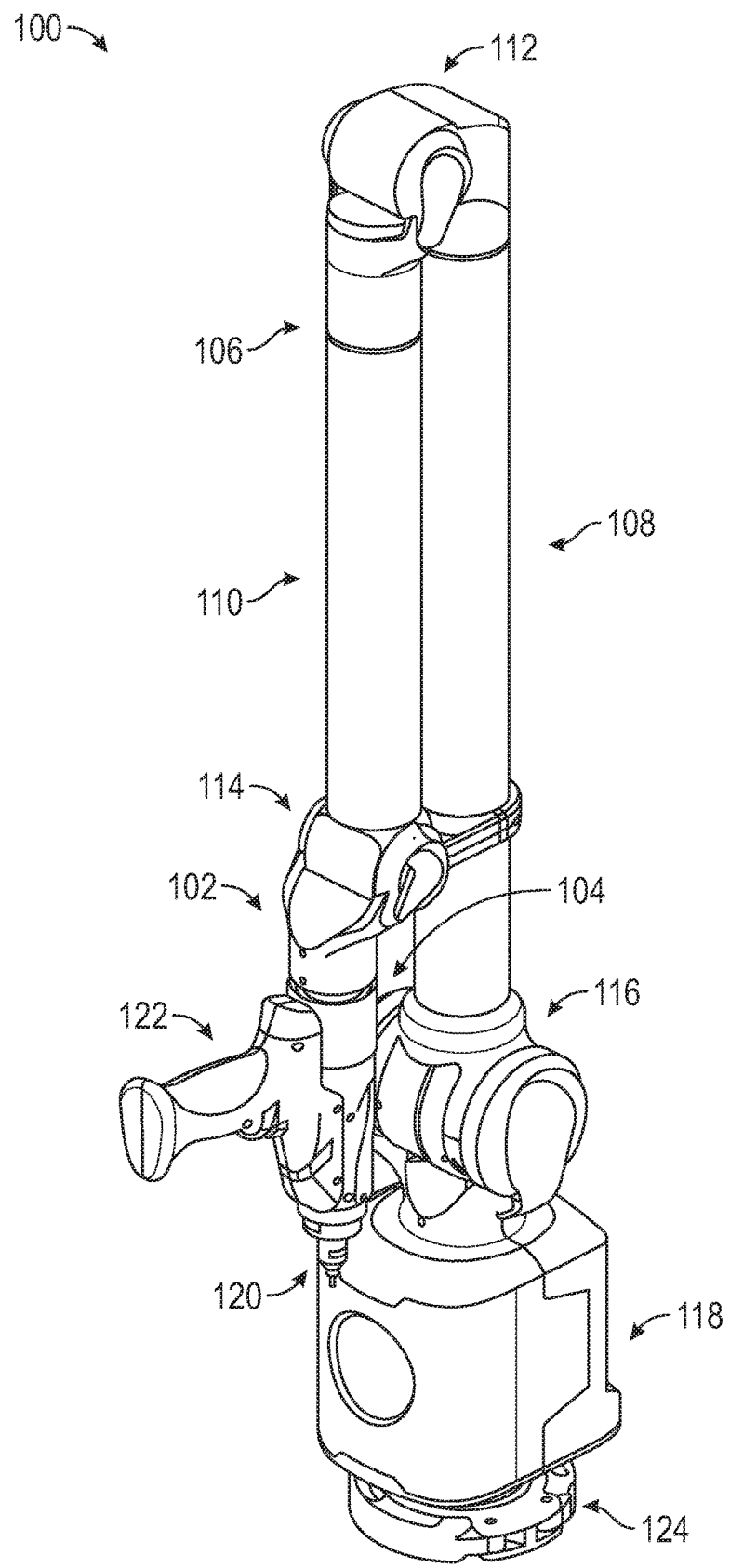
FIG. 1B is another isometric view of the portable AACMM of FIG. 1A.

FIGS. 1A and 1B illustrate, in perspective, a portable articulated arm coordinate measuring machine (AACMM) 100 that may be employed with embodiments of the present disclosure. The AACMM 100 is one type of coordinate measuring machine that can be employed with embodiments of the present disclosure, and thus the discussion and description is presented herein merely for illustrative and explanatory purposes, and the specific illustrative embodiments are not intended to be limiting.

As shown in FIGS. 1A and 1B, the AACMM 100 may comprise a six or seven axis articulated measurement device having a probe device 102 that includes a measurement probe housing 104 coupled to an arm portion 106 of the AACMM 100 at one end. The arm portion 106 comprises a first arm segment 108 coupled to a second arm segment 110 by a rotational connection having a first rotary assembly 112 (e.g., one or more rotary assemblies). A second rotary assembly 114 (e.g., one or more rotary assemblies) couples the second arm segment 110 to the measurement probe housing 104. A third rotary assembly 116 (e.g., one or more rotary assemblies) couples the first arm segment 108 to a control unit 118 located at the other end of the arm portion 106 of the AACMM 100. Each of the rotary assemblies 112, 114, 116 provides for multiple axes of articulated movement. In some embodiments, the rotary assemblies 112, 114, 116 may be configured or replaced by groupings of rotary assemblies, and thus single rotary assembly arrangements are not to be limiting. Further, the measurement probe housing 104 of the probe device 102 can include a shaft of a seventh axis portion of the AACMM 100 (e.g., a rotary assembly containing measurement probe or measurement probe system that determines movement of the measurement device, for example a probe 120, in the seventh axis of the AACMM 100). In this illustrative embodiment, the probe device 102 may rotate about an axis extending through the center of the measurement probe housing 104. In use of the AACMM 100, the control unit 118 is typically affixed to a work surface.

Each rotary assembly 112, 114, 116 typically contains a measurement system (e.g., an optical angular measurement system, an angular transducer, etc.). The measurement system (i.e., transducer) provides an indication of the position of the respective arm segments 108, 110 and corresponding rotary assemblies 112, 114, 116 (or rotary assembly groupings) that, all together, provide an indication of the position of the probe 120 with respect to the control unit 118 (and, thus, the position of an object being measured by the AACMM 100 in a certain frame of reference—for example a local or global frame of reference). The arm segments 108, 110 may be made from a suitably rigid material such as, but not limited to, a carbon composite material, for example. The portable AACMM 100 with six or seven axes of articulated movement (i.e., degrees of freedom) provides advantages in allowing an operator to position the probe 120 in a desired location within a 360° area about control unit base 118 while providing an arm portion 106 that may be easily handled by the operator. However, it should be appreciated that the illustration of an arm portion 106 having two arm segments 108, 110 is for exemplary purposes, and the claimed invention should not be so limited. An AACMM in accordance with embodiments of the present disclosure may have any number of arm segments coupled together by rotary assemblies (and, thus, more or less than six or seven axes of articulated movement or degrees of freedom).

As will be appreciated by those of skill in the art, each of the rotary assemblies 112, 114, 116 may optionally include one or more slip rings. The slip rings allow for the transfer of electricity (e.g., power and/or data) along the length of the arm portion 106 while still allowing each of the rotary assemblies 112, 114, 116 to rotate substantially unencumbered and independently from each other.

The probe 120 is detachably mounted to the measurement probe housing 104, which is connected to the second rotary assembly 114. A handle 122 is removably connected or attached to the measurement probe housing 104 by way of, for example, a quick-connect interface. In the some embodiments, a quick-connect interface may include both mechanical fastening members that secure the handle 122 and/or the probe 120 to the housing 102 and electrical connections that allow a user to control the probe 120 through the handle 122 (e.g. actuation buttons) and also provide for high speed data communication between the handle 122 and/or the probe 120 and the control unit 118. In some embodiments, the handle 122 and/or the probe 120 may be replaced with another device or accessory (e.g., a laser line probe, a bar code reader), thereby providing advantages in allowing the operator to use different measurement devices with the same AACMM 100.

In some embodiments, the probe 120 may be removably attached to the measurement probe housing 104. In some embodiments, the probe 120 may be a contacting measurement device and may have different tips or ends that are arranged to enable physical contact with an object to be measured, including, but not limited to ball, touch-sensitive, curved, and extension type probes. In other embodiments, the measurement may be performed, for example, by a non-contacting device such as a laser line probe (LLP). In one example embodiment, the handle 122 may be replaced with an LLP using a quick-connect interface. Other types of accessory devices may replace the removable handle 122 to provide additional functionality. Examples of such accessory devices include, but are not limited to, one or more illumination lights, temperature sensors, thermal scanners, bar code scanners, projectors, paint sprayers, cameras, video cameras, audio recording systems, etc.

In some embodiments, such as shown in FIGS. 1A and 1B, the AACMM 100 may include a removable handle 122 attached to the measurement probe housing 104 that provides advantages in allowing accessories, devices, and/or functionality to be changed without removing the measurement probe housing 104 from the second rotary assembly 114. As noted above, the removable handle 122 may also include one or more electrical connectors that allow electrical power and/or data to be exchanged between the handle 122 and corresponding electronics located in the probe 102 and/or the control unit 118.

In various embodiments, and as will be discussed in more detail below, each rotational connection of the AACMM 100 includes the rotary assemblies 112, 114, 116 that allow the arm portion 106 of the AACMM 100 to move about multiple axes of rotation. As mentioned, each rotary assembly 112, 114, 116 includes a corresponding measurement system, such as optical angular encoders for example, that are each arranged coaxially with the corresponding axis of rotation of, e.g., the arm segments 108, 110. The measurement systems detect rotational (swivel) or transverse (hinge) movement of, for example, each one of the arm segments 108, 110 about a corresponding axis and transmits a signal to an electronic data processing system within the AACMM 100. In some embodiments, each individual raw encoder count may be sent separately to the electronic data processing system as a signal where it is further processed into measurement data.

The control unit 118 may include an attachment device or mounting device 124. The mounting device 124 allows the AACMM 100 to be removably mounted to a desired location, such as a base, an inspection table, a machining center, a wall, the floor, etc. In accordance with an embodiment, the control unit 118 of the portable AACMM 100 contains or houses an electronic data processing system that includes various electronic and/or processing components. For example, in one non-limiting embodiment, the control unit 118 can contain or house a processing system that processes data received from the various measurement probe systems within the AACMM 100 (e.g., within the rotary assemblies 112, 114, 116) as well as data representing other arm parameters to support three-dimensional (3-D) positional calculations and a user interface processing system that includes an on-board operating system, a touch screen display, and resident application software that allows for relatively complete metrology functions to be implemented within the AACMM 100 without the need for connection to an external computer, although such connection may be employed in some embodiments.

The electronic data processing system in the control unit 118 may communicate with the measurement probe systems, sensors, and other peripheral hardware located away from the control unit 118 (e.g., a LLP that can be mounted to or within the removable handle 122 on the AACMM 100). The electronics that support these peripheral hardware devices or features may be located in each of the rotary assemblies 112, 114, 116 located within the portable AACMM 100.

Although shown and described with respect to an articulated arm coordinate measuring machine, the present disclosure is not to be limited thereby. For example, although an arm configuration has been shown and described, various other movement/rotational device systems may incorporate embodiments described herein. That is, various types of systems, assemblies, devices, components, etc. can incorporate rotary assemblies as described with respect to the articulated arm coordinate measuring machine of FIGS. 1A-1B, including rotatable platters, turntables, conveyor belts, rotatable imagers, etc.

As noted above, typically, portable articulated arm coordinate measuring machines (AACMMs) are manual, with an operator manually moving a probe or other device attached at the end of one or more articulated arms. The articulated arms include modular rotary assemblies, as described above, that form each of the kinematics joints of the arm. For example, each rotary assembly consists of a pair of bearings between a shaft and housing, and couples with high precision encoders for position feedback. In one non-limiting example, six or seven such rotary assemblies may be assembled together with mechanical linkages and all the necessary electronics to precisely read joint positions while articulating the arm manually. Using the position feedback, a predictive model can compute the three-dimensional position of the probe and/or points on a laser line in the case of a laser line probe.

Embodiments described here are directed to motorized rotary assemblies that may replace the rotary assemblies of prior assemblies. For example, embodiments add a motor and controller to the rotary assemblies within the housings thereof. Advantageously, for example, automated metrology applications can be enabled through use of motors within the rotary assemblies.

Figure 2A:
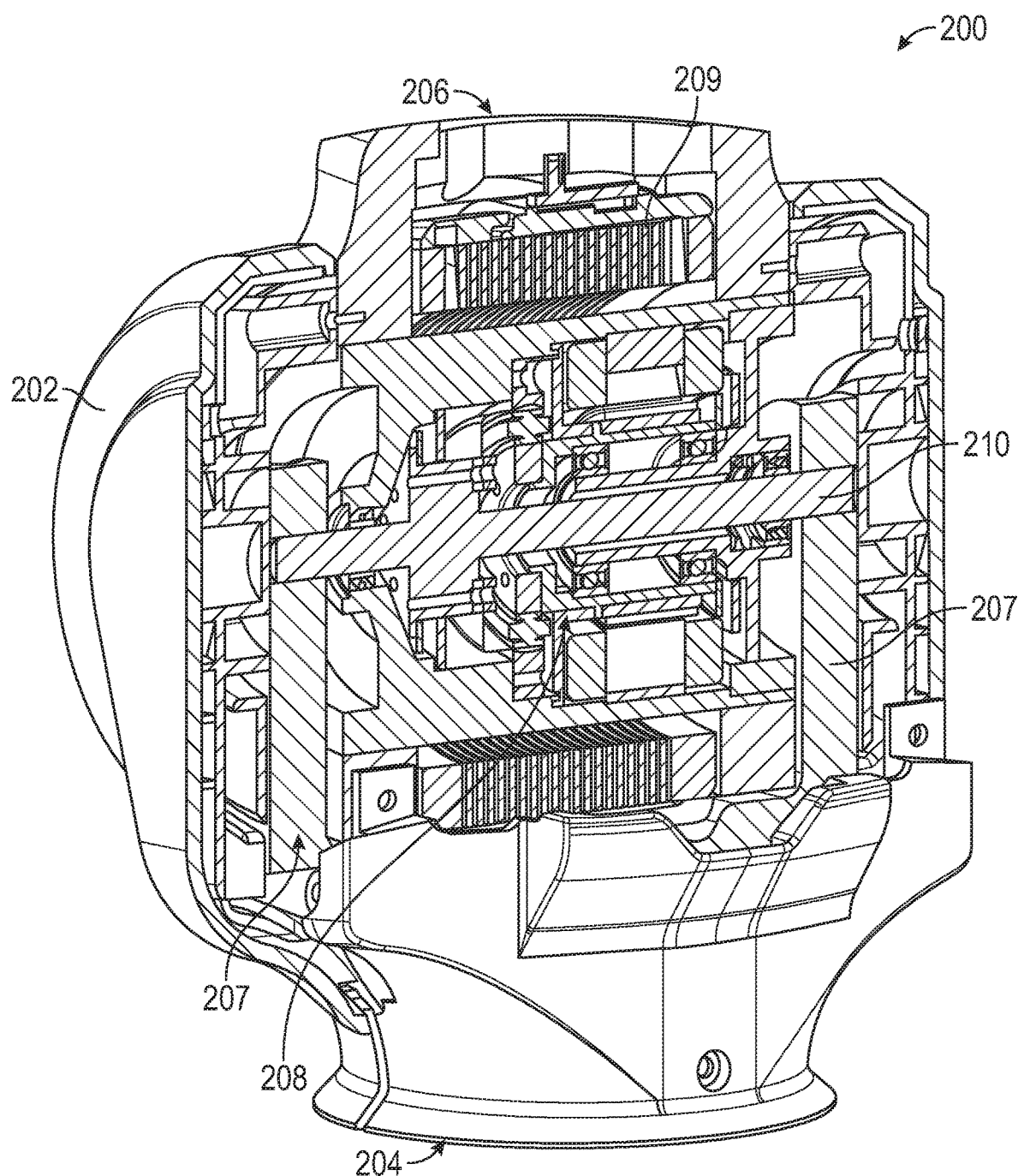
FIG. 2A is a schematic illustration of a motorized rotary assembly in accordance with an embodiment of the present disclosure.
Figure 2B:
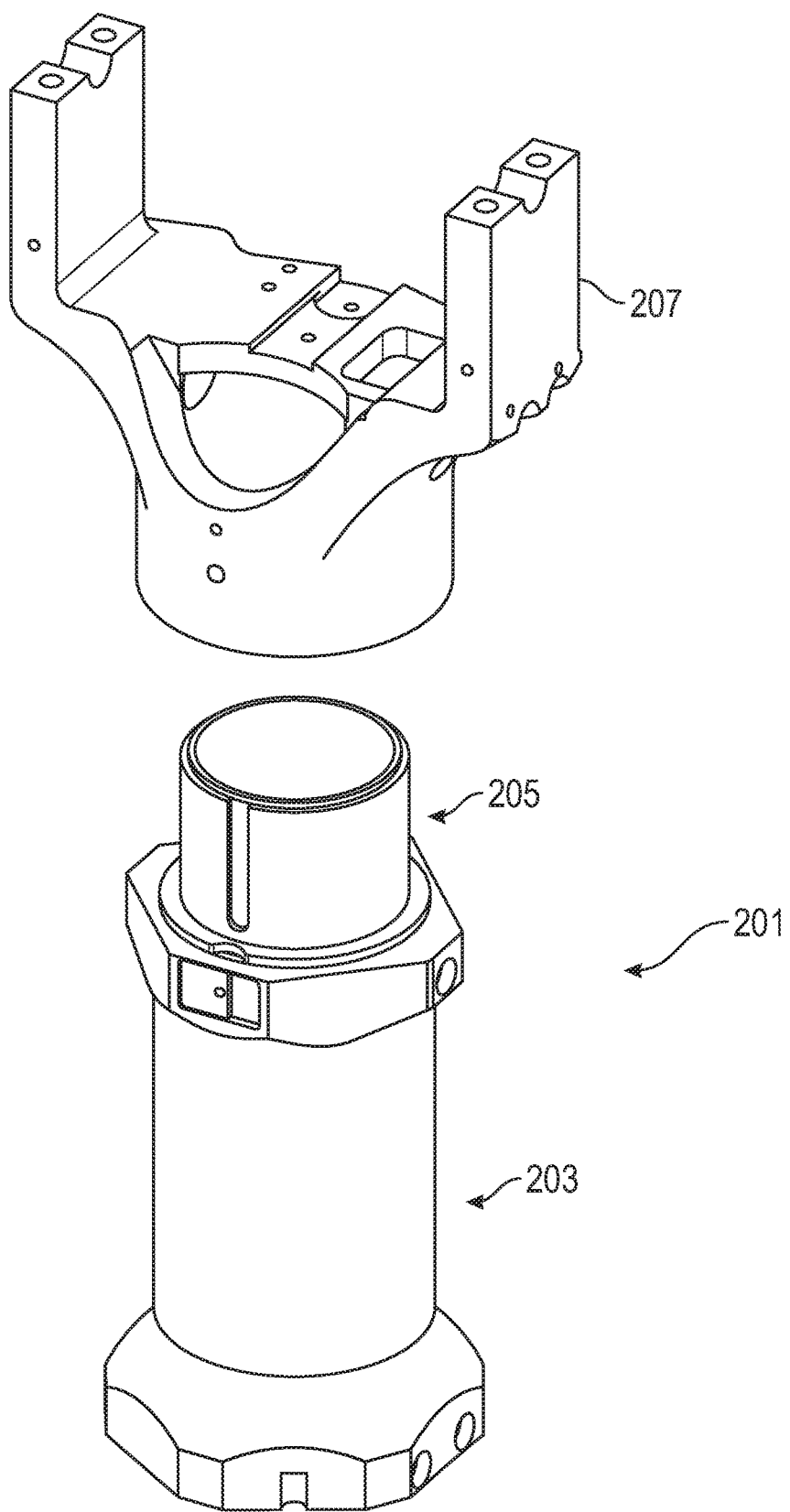
FIG. 2B is a schematic illustration of an additional motorized rotary assembly that is connectable to the motorized rotary assembly shown in FIG. 2A.

Turning now to FIGS. 2A-2B, schematic illustrations of a motorized rotary assembly 200 in accordance with an embodiment of the present disclosure is shown. The motorized rotary assembly 200, in this embodiment, is representative of a rotary assembly of a portion of an AACMM. Although the present motorized rotary assembly 200 will be described and shown in a specific arrangement, those of skill in the art will appreciate that the present teachings may be applied to any rotary assembly arrangement for use with AACMMs and/or with other systems, as described herein or variations thereon. That is, the present description and teachings are not to be limiting, but rather are merely illustrative and descriptive of a non-limiting embodiment of a motorized assembly in accordance with the present disclosure.

The motorized rotary assembly 200 includes a rotary assembly housing 202 having a first end 204 and a second end 206. Located within the rotary assembly housing 202 is a drive assembly 208 that is arranged with an output shaft 210. The first end 204 of the rotary assembly housing 202 may be arranged to connect to another structure, such as a control unit, an arm, a base or platform, or some other structure. Similarly, the second end 206 of the rotary assembly housing 202 may be arranged to connect to another structure, such as a control unit, an arm, a base or platform, or some other structure. The motorized rotary assembly 200 enables relative movement between the structures connected at each of the ends 204, 206 and/or relative to the rotary assembly housing 202 itself. The motorized rotary assembly 200 is arranged to allow for motorized operation and also for manual operation, thus allowing a user to manually move elements attached to the rotary assembly housing 202 and/or the rotary assembly housing 202 itself. The output shaft 210 may engage with an additional rotary assembly 201 (motorized or non-motorized), as shown in FIG. 2B. The combination of the motorized rotary assembly 200 and the additional rotary assembly 201 can provide for multiple dimensions of movement, as will be appreciated by those skilled in the art and in view of the teachings herein.

FIG. 2B is a schematic illustration of the rotary assembly 201 that can operably attach and connect to the motorized rotary assembly 200 (e.g., as shown in FIG. 2A). The rotary assembly 201 may be similar in structure and operation as the motorized rotary assembly 200 and/or that shown and described above. The rotary assembly 201 includes a rotary assembly housing 203, a rotary shaft 205, and a yoke structure 207. In an embodiment, the rotary shaft 205 may be driven by a motorized rotary assembly 200 disposed within the rotary assembly housing 203. In another embodiment, the rotary shaft 205 may rotate on bearing assembly such as that described in commonly owned United States Patent Application 2018/0216923 entitled "Articulated Arm Coordinate Measuring Device", the contents of which are incorporated by reference herein. The rotary shaft 205 will thus rotate the yoke structure 207, which may be fixedly attached or connected to the rotary shaft 205. The yoke structure 207 is configured to receive ends of the output shaft 210, as shown in FIG. 2A. The output shaft 210 of the motorized rotary assembly 200 may be clamped between upper prongs of the yoke structure 207 and yoke caps (not labeled). As such, the output shaft 210 may be fixed in relation to the rotary assembly 201 and/or the rotary assembly housing 202.

It should be appreciated that when the motorized rotor assembly 200 is incorporated into the rotary assembly 116 (i.e. the second axis of rotation), the drive assembly 208 can provide a counterbalance for the weight of the arm portion 106 and any probes 120 or other accessories coupled to the end of the arm portion. In an embodiment, the drive assembly 208 may cooperate with a spring 209 to offset the weight of the arm portion 106 and maintain the arm segment 108 at a desired position. The spring 209 may be the same as that described in the aforementioned United States Patent Application 2018/0216923. This provides advantages over prior art systems that relied solely upon a spring, a gas piston, or a combination of the foregoing. It should be appreciated that the force response of a spring or a gas piston is not linear over the range of motion of the arm portion 106. Thus, in the prior art AACMM system, the ability of the spring or gas piston to perform the counterbalance function may be inadequate depending on the position of the arm segment 108.

In embodiments provided herein, the drive assembly 208, by itself or in combination with the spring 209, may provide adequate torque to maintain the arm segment 108 at a desired position when the operator removes their hand from the arm portion 106. In other words, the drive assembly 208 in combination with the motor control, actively counterbalance the weight of the arm portion 106 during operation. In an embodiment, the torque provided by the drive assembly 208 is based on the position of the arm segment 108 (e.g. via a look up table). In another embodiment, the torque is based at least in part on the application or removal of an external force (e.g. the operator's hand). In other words, when the operator is moving the arm portion 106 the torque may be reduced (e.g. reducing the load on the operator) and then may be increased when the application of the external force is removed (e.g. to maintain the first arm segment 108 in position).

In an embodiment, the desired position of arm segment 108 is determined based on the current position of other encoders in the arm (e.g. the optical angular encoders located in the rotary assemblies 201, 112, 114) to achieve a predetermined desired positioning of arm segment 108. It should be appreciated that the torque provided by the drive assembly 208 is function of the desired position. This desired position can be overridden by the operator by moving an arm segment 108, 110 to a different position, in which case the drive assembly 208 will hold the arm segment 108 in this new position.

In an embodiment, the drive assembly 208 may be operated in as active counterbalance in an automatic mode where the predetermined desired position is maintained (determined based on the position of other encoders). Alternatively or in combination with the automatic mode, the drive assembly 208 can be operated in a or a manual-lock-mode" where the drive assembly 208 keeps arm segment 108 in a position defined by the operator and actively maintains that position as described in the control loop (FIG. 6) so that the operator can remove their hand (external forces) to maintain the desired position. In some embodiments, the operator may position the arm segment 108 in a particular position to avoid hitting other objects or for any other reason. In an embodiment, the desired position may be user defined.

Figure 3A:
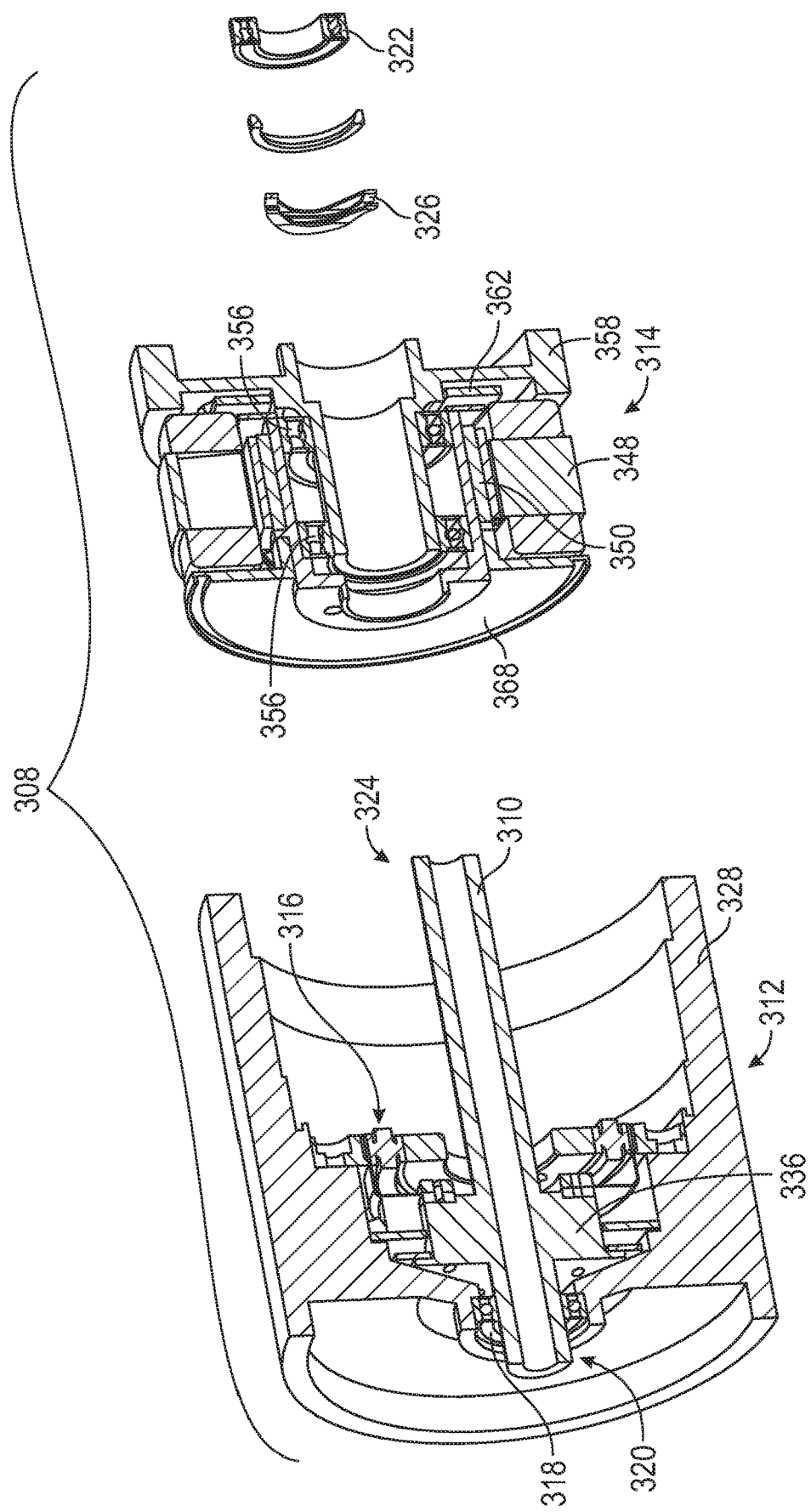
FIG. 3A is a partial exploded schematic illustration of a drive assembly of a motorized rotary assembly in accordance with an embodiment of the present disclosure.
Figure 3B:
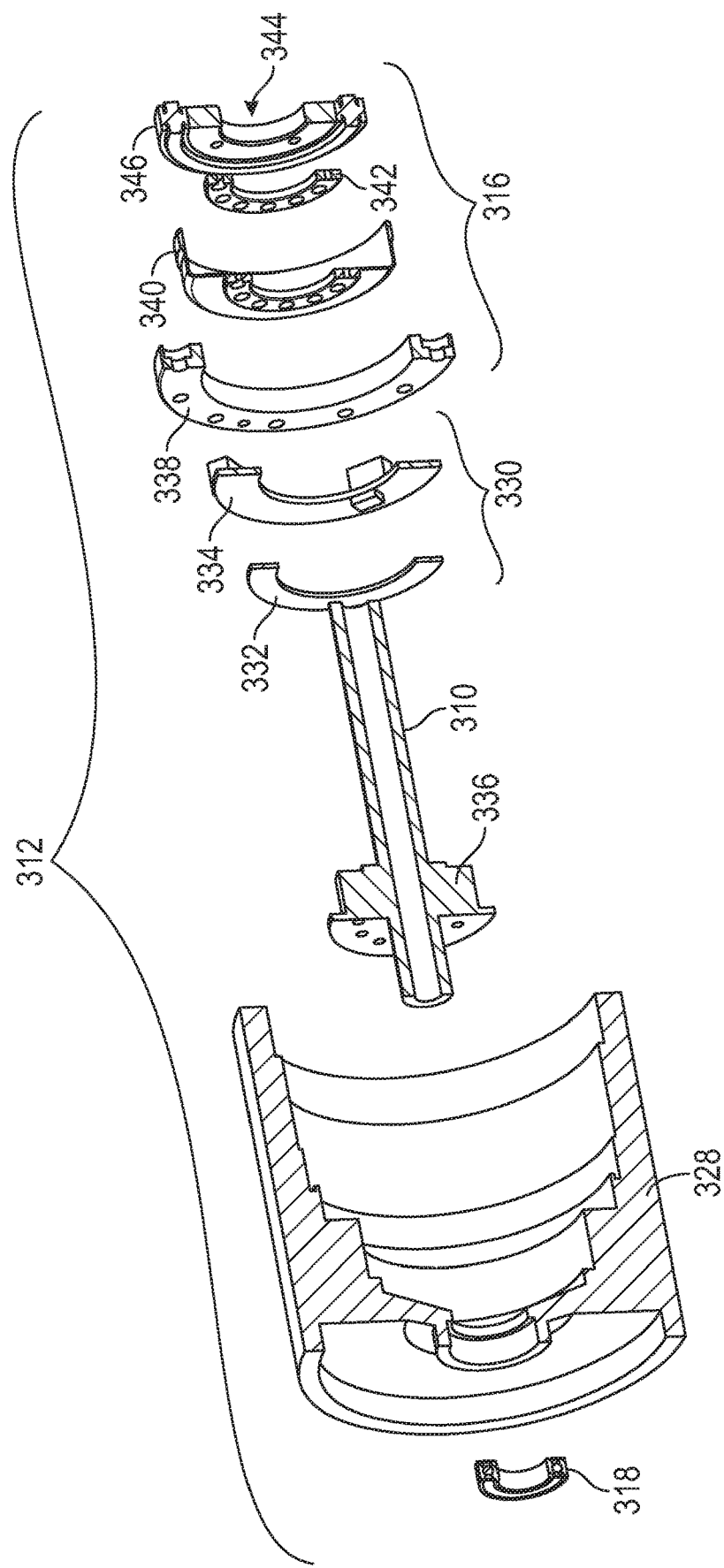
FIG. 3B is a partial exploded schematic illustration of an output subassembly of the drive assembly of FIG. 3A.
Figure 3C:
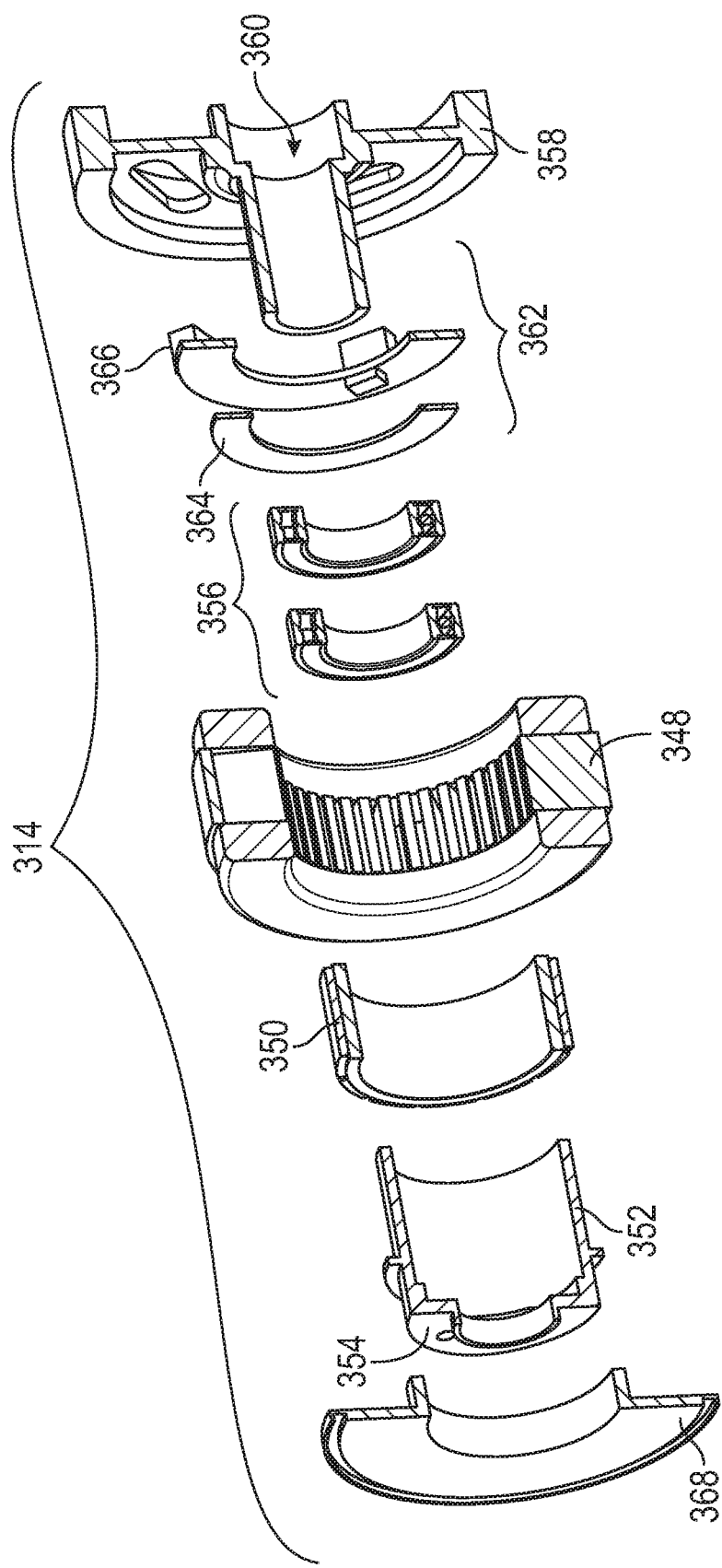
FIG. 3C is a partial exploded schematic illustration of a motor subassembly of the drive assembly of FIG. 3A.

Turning now to FIGS. 3A-3C, schematic illustrations of a drive assembly 308 and components thereof in accordance with an embodiment of the present disclosure are shown. FIG. 3A is an exploded illustration of the drive assembly 308 that drives the output shaft 310. The drive assembly 308 includes an output subassembly 312 and a motor subassembly 314. The output shaft 310 is arranged to be driven by the output subassembly 312 and the motor subassembly 314. The motor subassembly 314 includes a drive motor that is operably connected to the output subassembly 312, and a gear assembly 316 thereof, to drive the output shaft 310. A set of encoders are operably connected and arranged within the motorized rotary assembly to enable monitoring of movement or rotation of, at least, the output subassembly 312 and the motor subassembly 314 (or parts thereof). As described in more detail herein, in an embodiment, the encoders are arranged to allow for the determination of a differential between the input and the output of the drive assembly 308.

The output shaft 310 may have a first bearing 318 at a first end 320 and a second bearing 322 at a second end 324 thereof. In some embodiments, a preload element 326, such as a wave spring or other biasing element, may be arranged to preload one or more of the bearings 318, 322.

In the present embodiment, the motor subassembly 314 is arranged to fit within the output subassembly 312. For example, as shown, the output subassembly 312 includes an output housing 328 into which the output shaft 310, the gear assembly 316, the motor subassembly 314, and the bearings 318, 322 may be installed. The output housing 328 is configured to enable installation into a motorized rotary assembly.

FIG. 3B is an exploded schematic illustration of the output subassembly 312. The output subassembly 312 includes an output encoder element 330, having an encoder disk 332 and a read head 334. As will be appreciated by those of skill in the art, the read head 334 is configured to measure relative rotation of the encoder disk 332 and thus enables monitoring of rotational movement. The encoder disk 332, in some embodiments, may be affixed or attached to a shaft engagement element 336 to measure rotational movement of the output shaft 310. In some embodiments, such as shown in FIG. 3B, the shaft engagement element 336 may be integrally formed with or part of the output shaft 310. However, in other embodiments, the shaft engagement element 336 may be a separate element that is installed or connected to the output shaft 310 (e.g., by fasteners, adhesives, interference/press fit, etc.).

The output subassembly 312 also includes the gear assembly 316. The gear assembly 316 is configured to be operably connected to the motor subassembly 314 to enable transfer of motion from the motor subassembly 314 to the output shaft 310. The gear assembly 316, in this embodiment, is a strain wave gear set and includes a circular spline 338, a flex spline 340, a clamping plate 342, and a wave generator 344. The wave generator 344 is driven by the motor subassembly 314 and is fixedly connected to the flex spline 340 by the clamping plate 342. As the wave generator 344 is rotated, the flex spline 340 is rotated within and relative to the circular spline 338. As will be appreciated by those of skill in the art, an inner diameter of the circular spline 338 includes a first set of teeth having a first number of teeth and the outer diameter of the flex spline 340 includes a second set of teeth having a second number of teeth that is different from the first number of teeth of the first set. Typically, in a strain wave generator, the second set includes one less tooth than the first set. The dynamic rotation is achieved by an elliptical element 346 of the wave generator 344. That is, an elliptical shape (the wave generator 344) is engaged with and rotated within the flex spline 340 to drive rotation of the flex spline 340 relative to the teeth of the circular spline 338.

The shaft engagement element 336 may be fixedly connected to the flex spline 340 and, optionally the clamping plate 340, through use of one or more fasteners, although other attachment mechanisms and/or devices may be used. Thus, when the flex spline 340 is rotated, the output shaft 310 will also be rotated. The output encoder element 330 will monitor a rotation of the output shaft 310.

Although shown and described as a strain wave drive/gear, other types of drive mechanisms may be employed as the gear assembly 316 without departing from the scope of the present disclosure. For example, in some embodiments, a cycloidal drive or cycloidal speed reducer may be used within the output subassembly 312. In such embodiment, an input shaft may operably connect to the motor subassembly 314, and an eccentrically mounted bearing may be arranged with a cycloidal disc and ring pins may be employed to drive an output element that is operably connected to the output shaft 310. Further, in some embodiments, the output shaft 310 may be the output element of the gear assembly 316 when arranged as a cycloidal drive.

Turning now to FIG. 3C, an exploded schematic illustration of the motor subassembly 314. In this example embodiment, the motor subassembly 314 has a stator-rotor arrangement. As such, a motor stator 348 is arranged to drive a motor rotor 350. The motor rotor 350 is operably connected to a motor output housing 352. The motor output housing 352 fixedly connects to the wave generator 344 of the gear assembly 316. In this embodiment, the wave generator 344 may be attached to an engagement surface 354 of the motor output housing 352, such as by fasteners, adhesives, etc. The motor output housing 352 is movably mounted about one or more motor bearings 356 which in turn are mounted about a motor hub 358. The motor hub 358 includes an output shaft aperture 360 through which the output shaft 310 may pass.

The motor subassembly 314 includes a motor encoder element 362, having an encoder disk 364 and a read head 366. As will be appreciated by those of skill in the art, the read head 366 is configured to measure relative rotation of the encoder disk 364 and thus enables monitoring of rotational movement. The encoder disk 364, in some embodiments, may be affixed or attached to the motor output housing 352 to measure rotational movement thereof.

Also shown, the motor subassembly 314 includes a shield element 368. The shield element 368 is arranged to prevent fluids (e.g., grease) that may be used in the motor subassembly 314 from entering into the output subassembly 312.

In operation of the motorized rotary assembly, the motor subassembly 314 will rotate with a relative fast rotational speed. However, due to the gear assembly 316, the rotational speed may be reduced when transferred to the output shaft 310, and thus, the output shaft 310 may be rotated at a relatively slow rotational speed.

In some embodiments, the output shaft 310 and/or the shaft engagement element 336 may have elastic properties. That is, one or both of these elements may be an elastic member that allows for stopping of rotation of the motorized rotary assembly without damage to the elements or components thereof. Furthermore, the elastic nature of the output shaft 310 and/or the shaft engagement element 336 enables operation and/or manipulation of the motorized rotary assembly by hand, and without operation of the motor subassembly 314.

Figure 4:
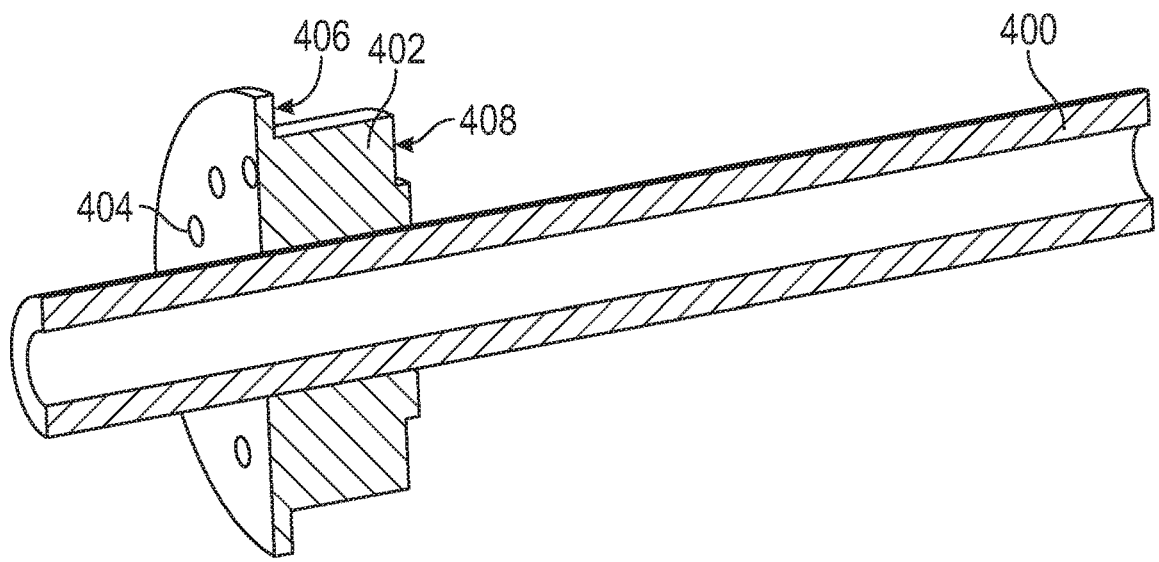
FIG. 4 is a schematic illustration of an output shaft in accordance with an embodiment of the present disclosure.

Turning now to FIG. 4, a schematic illustration of an output shaft 400 and shaft engagement element 402 in accordance with an embodiment of the present disclosure is shown. In this embodiment, in contrast to the embodiment of FIGS. 3A-3D, the shaft engagement element 402 is a separate element from the output shaft 400. The shaft engagement element 402 may be installed to the output shaft 400 by various means, such as fasteners, adhesives, press/interference fit, or by other means. In some embodiments, the output shaft 400 may be formed from an elastic material, to provide the stopping/manual operation described above. In some such embodiments, the shaft engagement element 402 may be formed from a rigid material and engage with the assemblies/subassemblies described above. In other embodiments, the shaft engagement element 402 may be formed from an elastic material and the output shaft 400 may be formed from a rigid material. Further, in still other embodiments, each of the output shaft 400 and the shaft engagement element 402 may be formed from elastic materials, and in some such embodiments, the materials may be the same or different, with different elastic materials enabling a customizable elasticity of the output shaft 400 and the shaft engagement element 402 during operation.

Also shown in FIG. 4, the shaft engagement element 402 includes a plurality of apertures 404 to enable fixed connection between the shaft engagement element 402 and a flex spline or other structure, as described above. The shaft engagement element 402 further includes an encoder engagement surface 406 and a gear engagement surface 408. The encoder engagement surface 406 is configured to receive an encoder disk and the gear engagement surface 408 is configured to receive the flex spline.

In addition to enabling manual stopping of the system, the elastic nature of various components can enable manual operation or manipulation. Accordingly, in some embodiment, the elastic elements enables teaching of the system for later automated operation. For example, a user may manually move one or more components or structures that are attached to a motorized rotary assembly having one or more elastic elements. The manual movement can be used to teach a computer to learn the indicated movements and then later electrical operation by the motorized rotary assembly can replicate the manual movements. It should be appreciated that the elastic elements allow for the manual operation while reducing or eliminating undesired wear on the components of the motorized rotary assembly due to relatively rapid or abrupt movements caused by a user. Furthermore, the elastic elements can enable a control system to have time to react to changes of the motorized rotary assembly. For example, the control system may require time to react to a manual change by the operator during a manual teaching operation, wherein movement is taught initially by human/manual interaction, and the control system learns from such movements. The elastic elements enable a period of time for the control system to react to such manual operation while reducing the impact of such manual movements on the motor components.

Figure 5:
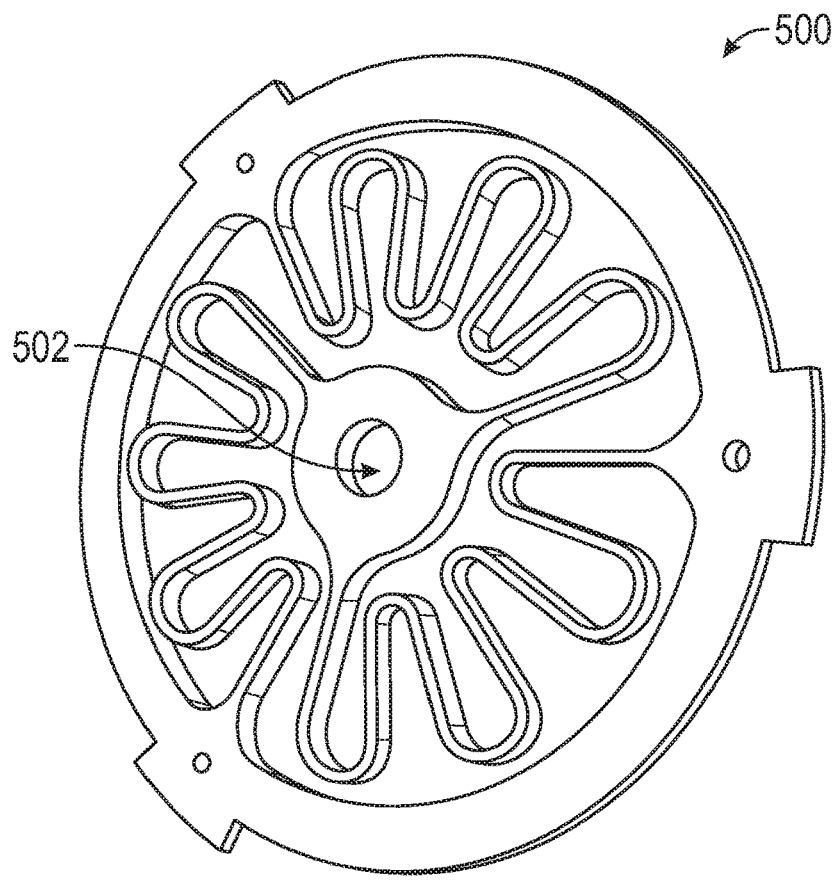
FIG. 5 is a schematic illustration of an elastic element that may be incorporated into embodiments of the present disclosure.

Turning to FIG. 5, an alternative elastic element 500 that may be used with embodiments of the present disclosure is shown. The elastic element 500 includes a shaft aperture 502 through which an output shaft may be installed, similar to that described above. The elastic member 500 provide an alternative, structural elasticity, rather than relying material elasticity. It will be appreciated that a combination of material and structural elasticity may be employed to achieve a desired level of elasticity.

As described above, the motorized rotary assemblies in accordance with embodiments of the present disclosure can include two sets of encoders (e.g., output encoder element and motor encoder element). The two sets of encoders enable monitoring relative movement (e.g., rotation) of two separate rotating elements within the motorized rotary assembly (i.e., the output shaft and the motor rotor). Through monitoring of the encoders, control of movement of a structure connected to the motorized rotary assembly may be achieved. Further, the encoders can enable teaching movement to a computer controlled system (e.g., manual teaching and computer controlled replication of such movements).

The control system of a motorized rotary assembly of the present disclosure may be based on a torque-feedback and position-feedback from both motor and load (e.g., from the sets of encoders described above). Depending on a mode of operation, a desired motor position and/or velocity may be decided based on the feedback from the encoder sets. The feedback may be received at an operation control and provided to a motor control for execution. In some embodiments, the motor control may be onboard and/or within the motorized rotary assembly. In other embodiments, the motor control may be external to the specific motorized rotary assembly, such as housed within a control unit (e.g., control unit 118 shown in FIGS. 1A-1B).

Figure 6:
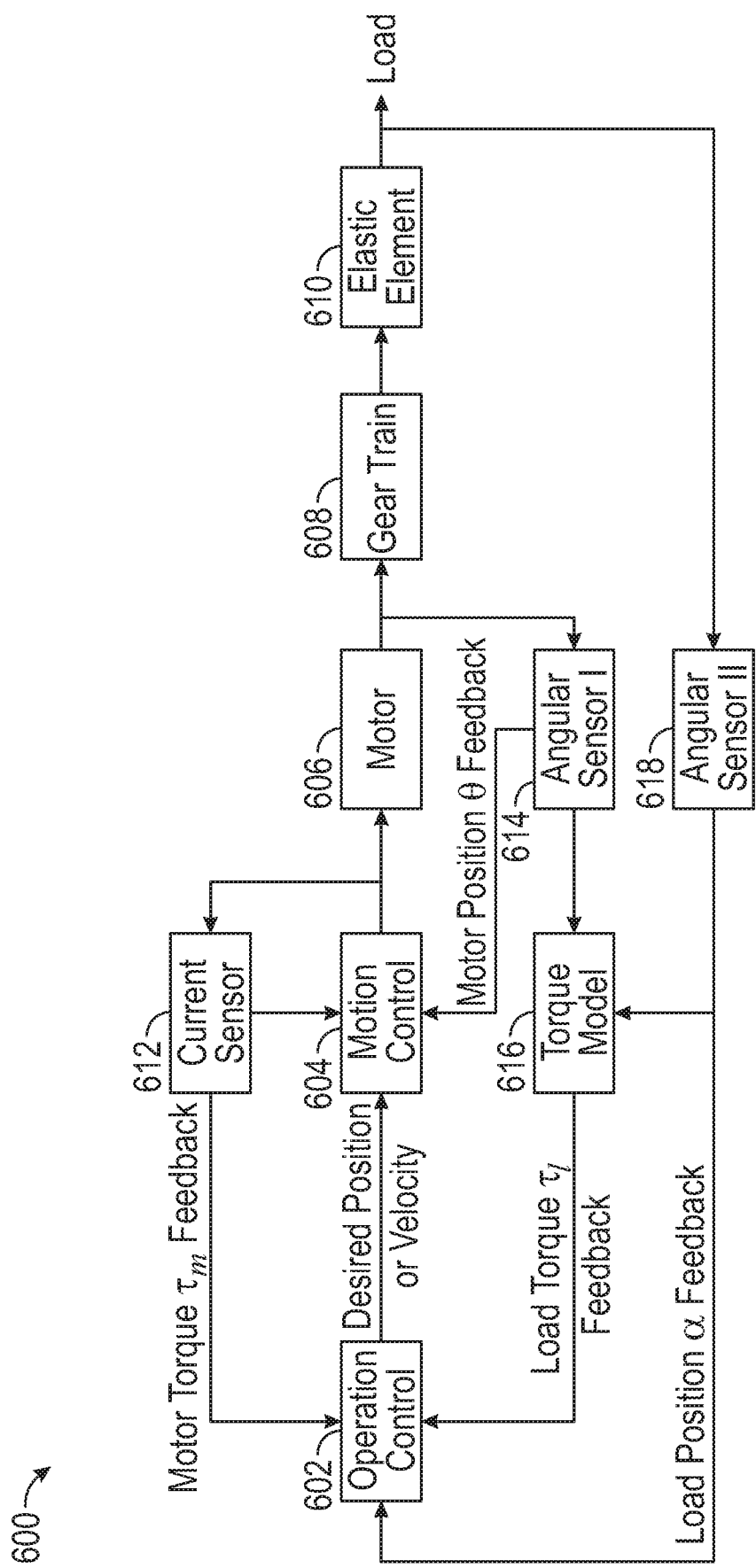
FIG. 6 is a schematic block diagram of a control system in accordance with an embodiment of the present disclosure.

Turning now to FIG. 6, a schematic block diagram of a torque-feedback control system 600 in accordance with an embodiment of the present disclosure is shown. An example of operation of control in accordance with the present disclosure is a torque-feedback controller that is configured to provide a desired motor position or motor velocity to the motor control and thus drive the motorized rotary assembly. An example of a motor control is a position-feedback PID controller that drives the motor to achieve desired motor position and/or velocity. An example of a motor that may be employed in embodiments described herein is a stepper motor, which can be controlled over current or voltage. An example of angular sensors that may be employed are optical encoders, as described above.

In FIG. 6, an operation control 602 is provided to enable control of operation of a motorized rotary assembly. The operation control 602 outputs a desired position and/or velocity to a motion control 604. The motion control 604 in turn transmits control to a motor 606 to drive or operation the motor 606. The motor 606 in turn drives operation of the gear assembly 608. The gear assembly 608, in turn, will transfer force into an elastic element 610, which in turn will drive motion of a load (e.g., an output shaft).

As shown, the control system 600 is a feedback-type system, wherein various feedback may be employed to ensure a desired control operation. As shown, a current sensor 612 may be operably connected to an output of the motion control 604 and provide feedback to both the motion control 604 and the operation control 602. For example, as shown, a motor torque $\tau_m$ feedback may be fed back into the operation control 602. A first angular sensor 614 may be operably connected to an output of the motor 606 and provide feedback to a torque model 616 and provide motor position 9 feedback to the motion control 604. The torque model 616 may also receive feedback from a second angular sensor 618 that is operably connected to an output of the elastic element 610. The torque model 616 may provide a load torque $\tau_l$ feedback to the operation control 602. Additionally, the second angular sensor 618 can provide load position a feedback to the operation control 602.

An example of a dynamic model of a motorized AACMM elastic joint in accordance with the present disclosure, and employing the control system 600 described above, can be expressed as:

$$M(\alpha)\ddot{\alpha}+C(\alpha,\dot{\alpha})\dot{\alpha}+G(\alpha)=K(\theta-\alpha) \quad (1)$$

$$\tau_m=B\ddot{\theta}+K(\theta-\alpha) \quad (2)$$

In equations (1) and (2), $\alpha$ is a load position, $\theta$ is a motor position, $M(\alpha)$ is a load inertia, B is a motor inertia, $\tau T_m$ is a motor generator torque, $C(\alpha, \dot{\alpha})$ is centripetal and Coriolis function, $G(\alpha)$ is gravity torque, and K is a torque constant of the elastic element 610.

The control strategies can be made based on the operation modes of AACMM motorized joints. For example, a regulation mode of operation may keep a constant equilibrium configuration of the position. A desired load position $\alpha_d$ is assigned while the motor position $\theta_d$ will be determined. The desired load position $\alpha_d$ may come from the kinematic inversion of a desired Cartesian position of a probe end. A tracking mode of operation may be designed to follow a smooth trajectory $\alpha_d$ (t). An associated motor trajectory $\theta_d$ (t) will be determined using the above relationships. A force-position hybrid control operation may be employed to detect the external torque and position applied on the arm and decisions with respect to the motor speed may be made to reduce a load torque.

In some embodiments, controllers for motor torque or position may be as follows:

$$\tau_m=-K_P(\alpha-\alpha_d)+G(\alpha_d) \quad (3)$$

$$\theta_d=\alpha_d+K^{-1}((G(\alpha_d))) \quad (4)$$

Where $K_P$ is the gain of a proportional controller.

In accordance with some embodiments, the control unit and/or control system (e.g., control system 600) includes one or more processors and memory. The processor(s) are configured to control methods for operating the coordinate measuring system or aspects/parts thereof (e.g., the coordinate measuring device(s) including motorized rotary assemblies described herein). The control methods may be stored in memory in non-transitory computer media, e.g., in the form of computer instructions, programs, applications, coding, etc. Embodiments disclosed herein may be implemented on any type of computer regardless of the platform being used. For example, a networked computer system may be employed. The networked computer system may include a processor, associated memory, a storage device, and numerous other elements and functionalities typical of computers as known in the art. The networked computer system may also include input means, such as a keyboard and a mouse, and output means, such as a monitor, display, etc. The networked computer system may be connected to a local area network (LAN) or a wide area network (e.g., the Internet) via a network interface connection. Those skilled in the art will appreciate that the input and output means may take many other forms. In some embodiments, the computer system may not be connected to a network. Further, those skilled in the art will appreciate that one or more elements of aforementioned computer system may be located at a remote location and connected to the other elements over a network. As such, a computer system, such as a networked computer system, and/or any other computer systems known in the art may be used in accordance with embodiments disclosed herein.

In some embodiments, one or more coordinate measuring devices can include one or more motorized rotary assemblies as described herein, to form a coordinate measuring system. In some embodiments, a control unit/system can be arranged to control the motorized rotary assemblies of the coordinate measuring devices to control movement of one or more aspects of the coordinate measuring devices (e.g., arms, articulated arms, platters, plates, imagers, etc.). The coordinate measuring system may include a control system (e.g., control system 600) that is operably connected to and/or in communication with one or more control units and/or the motorized rotary assemblies. In some embodiments, the control system may be arranged as a computer that is operably connected to the motorized rotary assemblies of a coordinate measuring system, with commands or other instruction sent from the control system to the motorized rotary assemblies and data or other information sent from the motorized rotary assemblies to the control system. The control system may further be connected to the internet, servers, networks, and/or other devices as will be appreciated by those of skill in the art.

Figure 7:
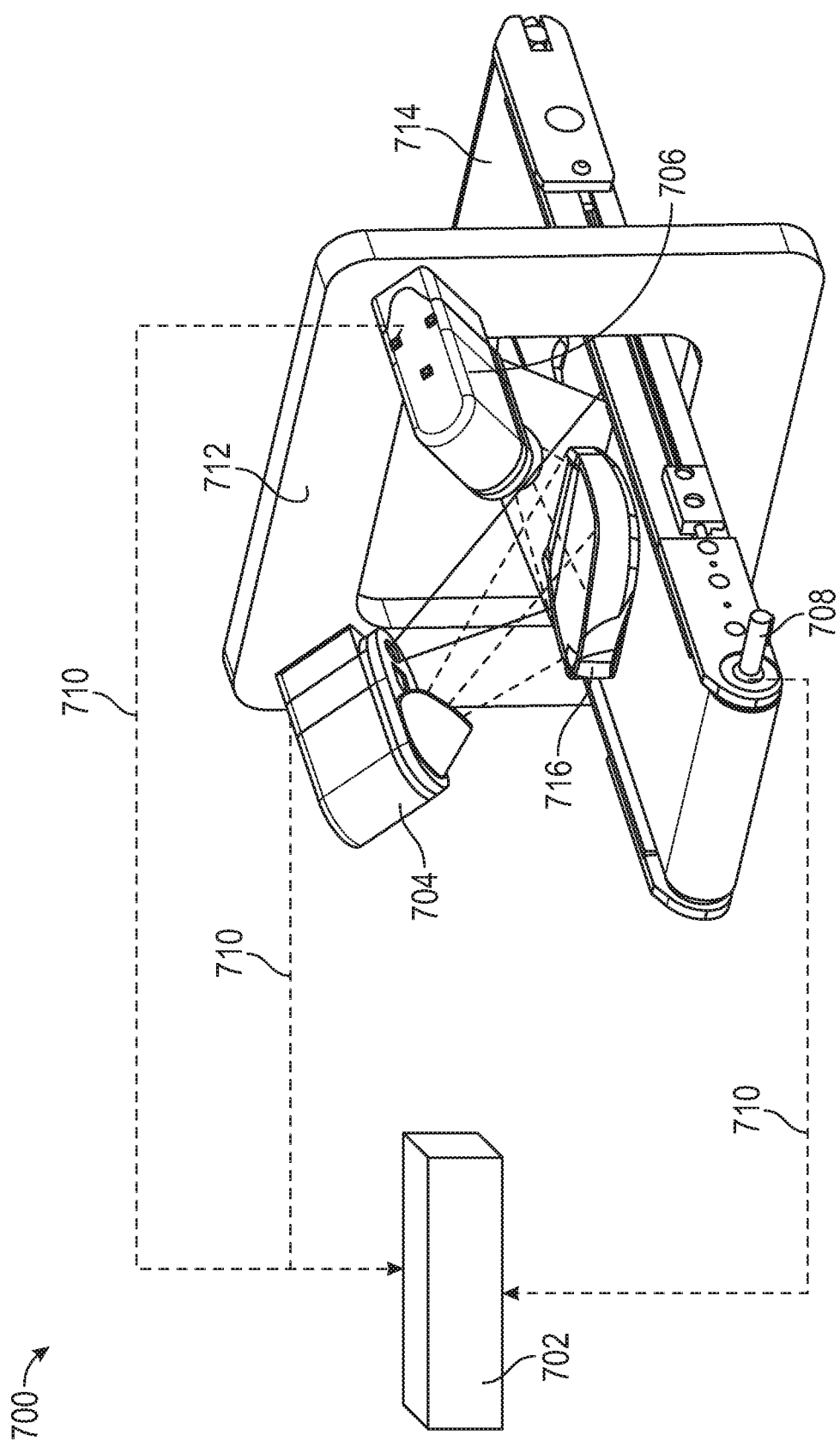
FIG. 7 is a schematic illustration of a coordinate measuring system in accordance with an embodiment of the present disclosure.

Turning now to FIG. 7, a schematic illustration of a coordinate measuring system 700 in accordance with an embodiment of the present disclosure is shown. The coordinate measuring system 700 may include various components that can incorporate one or more motorized rotary assemblies. The coordinate measuring system 700 includes a control unit 702 that is operably connected, in this embodiment, to a first coordinate measuring device 704, a second coordinate measuring device 706, and a third coordinate measuring device 708. The control unit 702 is configured to control operation of the first, second, and third coordinate measuring devices 704, 706, 708 and can transmit and receive information, commands, data, power, etc. therebetween. As shown, the control unit 702 is connected to or in communication with the coordinate measuring devices 704, 706, 708 through communications connections 710.

In this illustrative embodiment, the first coordinate measuring device 704 is a first laser line probe mounted to a frame 712 at a first position, the second coordinate measuring device 706 is a second laser line probe mounted to the frame 712 at a second position, and the third coordinate measuring device 708 is part of a conveyor 714. A scanned object 716 can be moved on the conveyor 714 through the frame 712 and the first and second coordinate measuring devices may make measurements associated with the scanned object 716. Each of the coordinate measuring devices 704, 706, 708 can include one or more motorized rotary assemblies, as shown and described above or variations thereon.

Figure 8:
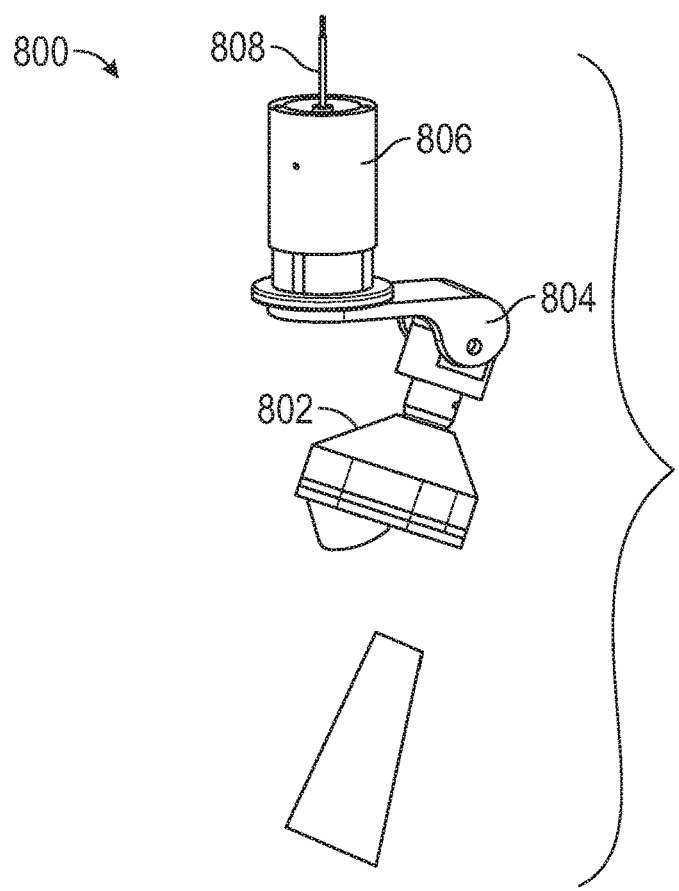
FIG. 8 is a schematic illustration of a coordinate measuring system in accordance with an embodiment of the present disclosure.

Turning now to FIG. 8, a schematic illustration of a coordinate measuring device 800 is shown. The coordinate measuring device 800 includes a laser line probe 802 movably mounted by a first motorized rotary assembly 804 and a second motorized rotary assembly 806. A communication connection 808 (e.g., an electrical wire) can be fed into and through the various components of the coordinate measuring device 800 to enable control of the motorized rotary assemblies 804, 806 and the laser line probe 802. Although shown with the laser line probe 802 attached to the motorized rotary assemblies 804, 806, various other attached devices can be used without departing from the scope of the present disclosure.

Figure 9:
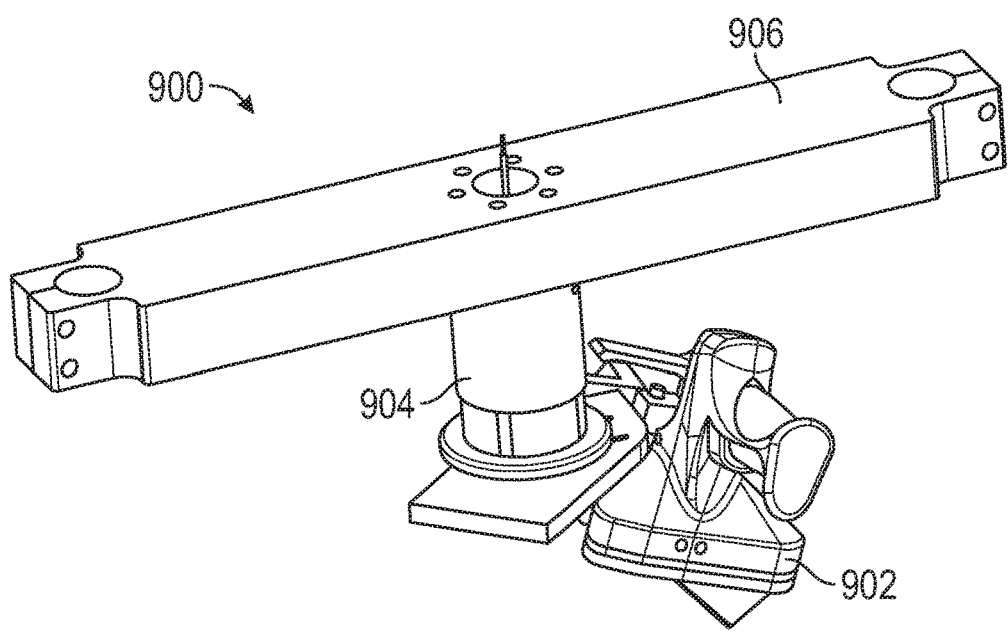
FIG. 9 is a schematic illustration of a coordinate measuring system in accordance with an embodiment of the present disclosure.

Turning now to FIG. 9, a schematic illustration of a coordinate measuring device 900 is shown. The coordinate measuring device 900 includes a laser line probe 902 movably mounted by a rotary assembly 904 which is attached to a frame 906. A communication connection (not shown) can be fed into and through the various components of the coordinate measuring device 900 to enable control of the rotary assembly 904 and the laser line probe 902. Although shown with the laser line probe 902 attached to the rotary assembly 904, various other attached devices can be used without departing from the scope of the present disclosure.

Figure 10B:
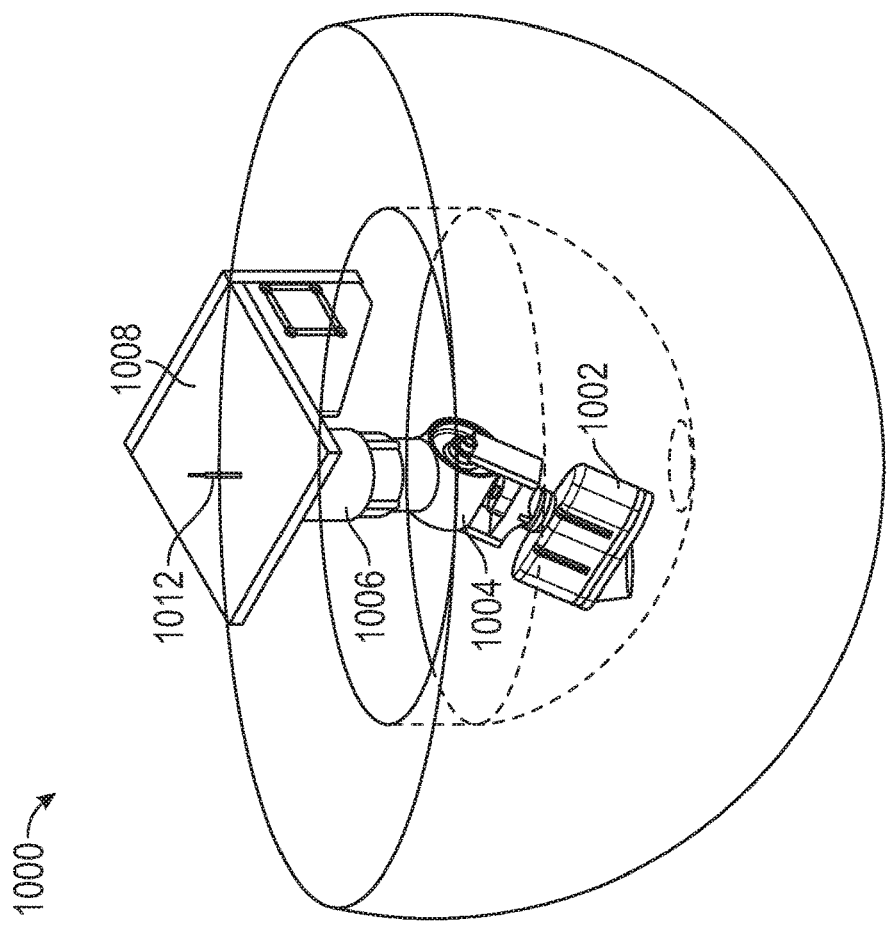
FIG. 10B is an alternative view of the coordinate measuring system of FIG. 10A.
Figure 10A:
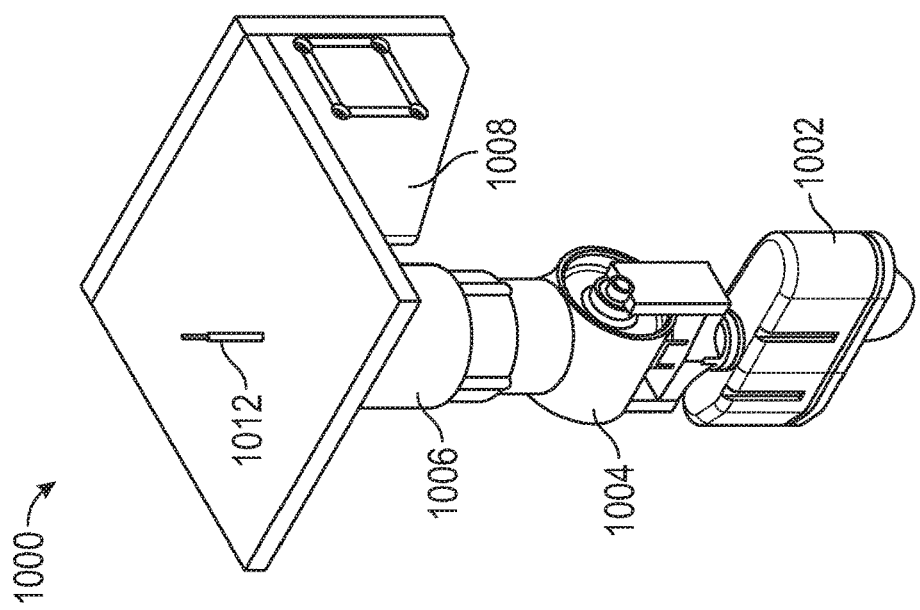
FIG. 10A is a schematic illustration of a coordinate measuring system in accordance with an embodiment of the present disclosure.

Turning now to FIGS. 10A-10B, schematic illustrations of a coordinate measuring device 1000 are shown. The coordinate measuring device 1000 includes a laser line probe 1002 movably mounted by a first rotary assembly 1004 and a second rotary assembly 1006 which are attached to a frame 1008. A communication connection 1012 can be fed into and through the various components of the coordinate measuring device 1000 to enable control of the first and second rotary assemblies 1004, 1006 and the laser line probe 1002. Although shown with the laser line probe 1002 attached to the rotary assemblies 1004, 1006, various other attached devices can be used without departing from the scope of the present disclosure. Attached devices of the present disclosure can include, but are not limited to, triangulation scanners, image scanners, structured light scanners, and/or photogrammetry devices.

Figure 11:
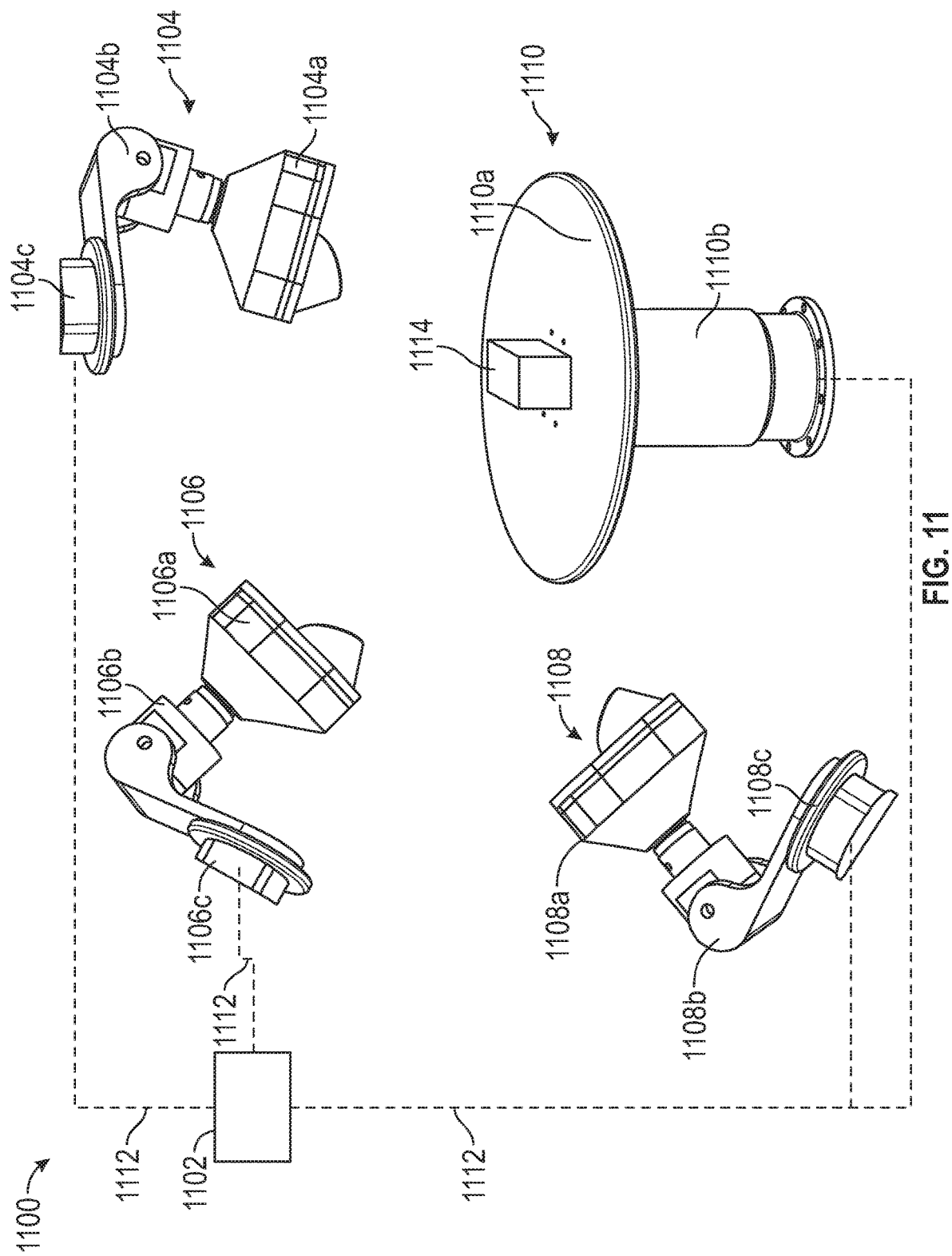
FIG. 11 is a schematic illustration of a coordinate measuring system in accordance with an embodiment of the present disclosure.

Turning now to FIG. 11, a schematic illustration of a coordinate measuring system 1100 in accordance with an embodiment of the present disclosure is shown. The coordinate measuring system 1100 may include various components that can incorporate one or more rotary assemblies. The coordinate measuring system 1100 includes a control unit 1102 that is operably connected, in this embodiment, to a first coordinate measuring device 1104, a second coordinate measuring device 1106, a third coordinate measuring device 1108, and a fourth coordinate measuring device 1110. The control unit 1102 is configured to control operation of the first, second, third, and fourth coordinate measuring devices 1104, 1106, 1108, 1110 and can transmit and receive information, commands, data, power, etc. therebetween. As shown, the control unit 1102 is connected to or in communication with the coordinate measuring devices 1104, 1106, 1108, 1110 through communications connections 1112.

In this illustrative embodiment, the first coordinate measuring device 1104 includes a first laser line probe 1104*a* movably mounted on a respective first rotary assembly 1104*b* and a respective second rotary assembly 1104*c*, such that the first laser line probe 1104*a* can image or otherwise obtain information associated with a scanned object 1114. The second coordinate measuring device 1106 includes a second laser line probe 1106*a* movably mounted on a respective first rotary assembly 1106*b* and a respective second rotary assembly 1106*c*, such that the second laser line probe 1106*a* can image or otherwise obtain information associated with the scanned object 1114. The third coordinate measuring device 1108 includes a third laser line probe 1108*a* movably mounted on a respective first rotary assembly 1108*b* and a respective second rotary assembly 1108*c*, such that the third laser line probe 1108*a* can image or otherwise obtain information associated with the scanned object 1114. The fourth coordinate measuring device 1110 of this embodiment is a turntable device having a platter 1110*a* that is mounted to a respective rotary assembly 1110*b* that is arranged to drive movement or rotation of the platter 1110*a*. As shown, the scanned object 1114 is placed on the platter 1110*a* of the fourth coordinate measuring device 1110. The control unit 1102 can control operation and movement of the coordinate measuring devices 1104, 1106, 1108, 1110 to enable obtaining information associated with the scanned object 1114.

Figure 12:
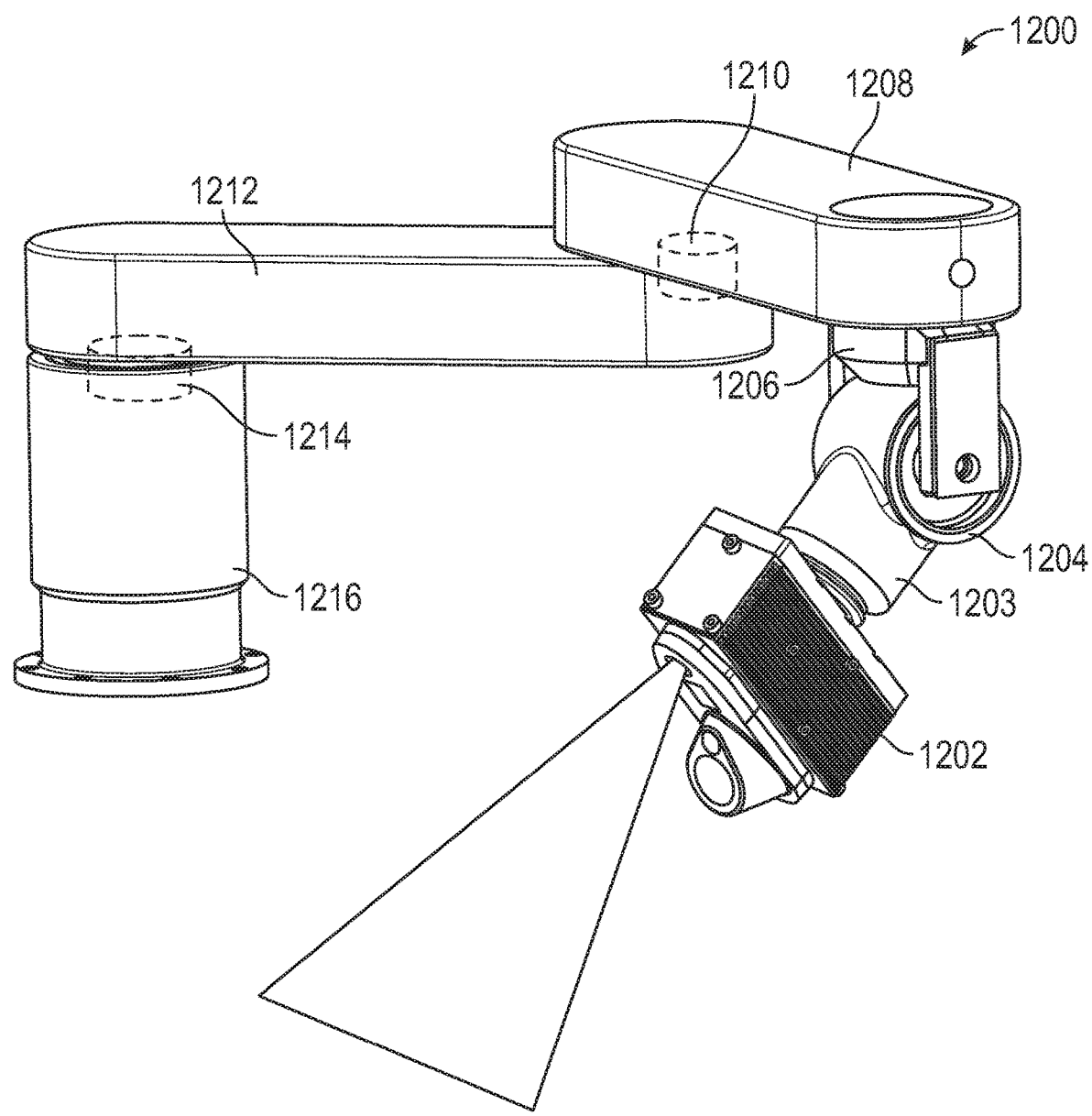
FIG. 12 is a perspective view of a coordinate measurement system in accordance with another embodiment of the present disclosure.

Turning now to FIG. 12, a schematic illustration of a coordinate measuring device 1200 is shown. The coordinate measuring device 1200 is sometimes referred to as a selective compliance assembly robotic arm (SCARA). The coordinate measuring device 1200 includes a laser line probe 1202 movably mounted to a first rotary assembly 1203. The first rotary assembly 1203 is coupled to a first arm 1208 by a second rotary assembly 1204 and a third rotary assembly 1206. The first arm 1208 couples the rotary assemblies 1204, 1206 to a third rotary assembly 1210. The first arm 1208 rotates about the axis defined by the rotary assembly 1210 in a first plane. In this embodiment, the third rotary assembly 1206 has an axis of rotation that is normal to the first plane. The rotary assembly 1210 couples the first arm to a second arm 1212. The second arm 1212 is mounted to a rotary assembly 1214 that is disposed within a base 1216. The second arm 1212 rotates in a second plane that is parallel to the first plane. A communication connection (e.g., an electrical wire) can be fed into and through the various components of the coordinate measuring device 1200 to enable control of the rotary assemblies 1203, 1204, 1206, 1210, 1214 and the laser line probe 1202. Although shown with the laser line probe 1202 attached to the rotary assemblies 1203, 1204, 1206, 1210, 1214 various other attached devices can be used without departing from the scope of the present disclosure.

Figure 13:
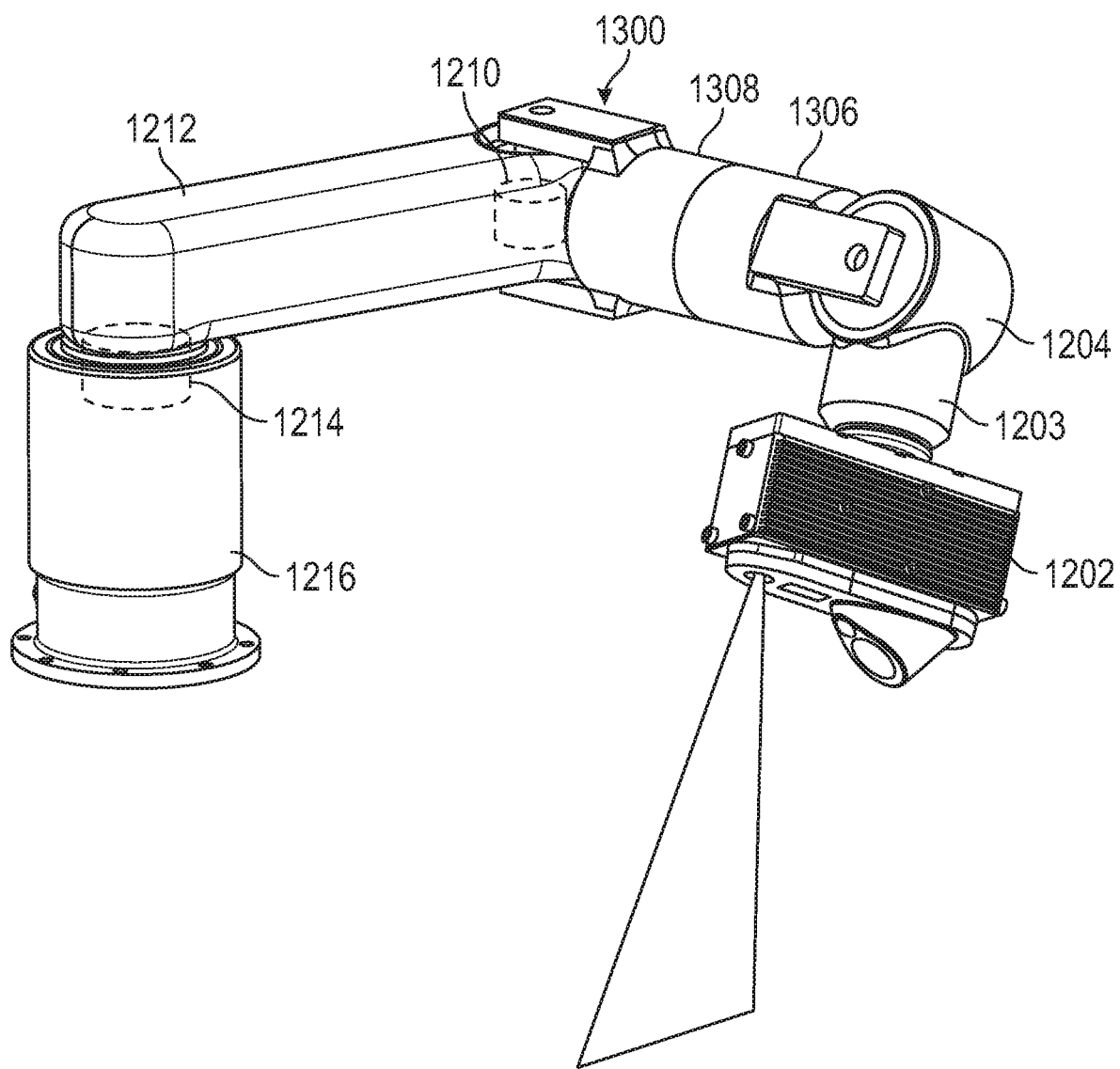
FIG. 13 is a perspective view of a coordinate measurement system in accordance with another embodiment of the present disclosure.

Referring now to FIG. 13, another embodiment of coordinate measurement device 1300 is shown having another SCARA robotic arm. This embodiment is similar to FIG. 12, except that the third rotary assembly 1306 extends from the end of the first arm 1308. In other words, the axis of rotation of the third rotary assembly 1306 is coplanar with or parallel to the first plane that the first arm 1308 rotates.

Figure 14:
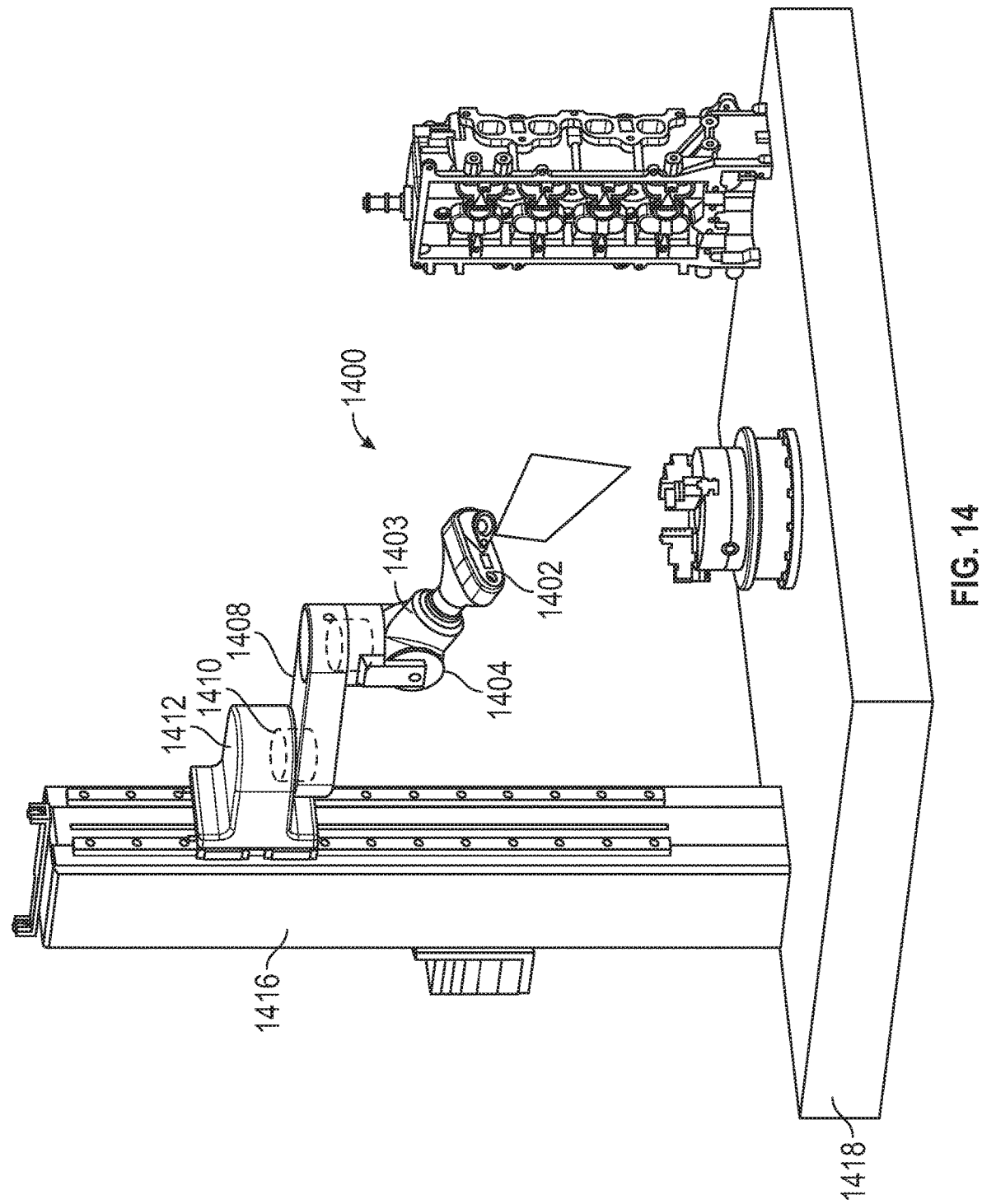
FIG. 14 is a perspective view of a coordinate measurement system in accordance with another embodiment of the present disclosure.

Referring now to FIG. 14, a schematic illustration of a coordinate measuring device 1400 is shown. The coordinate measuring device 1400 also includes a type of SCARA robotic arm. In this embodiment, the coordinate measuring device 1400 includes a laser line probe 1402 movably mounted to a first rotary assembly 1403. The first rotary assembly 1403 is coupled to a first arm 1408 by a second rotary assembly 1404 and a third rotary assembly 1406. The first arm 1408 couples the rotary assemblies 1404, 1406 to a third rotary assembly 1410. The first arm 1408 rotates about the axis defined by the rotary assembly 1410 in a first plane. In this embodiment, the third rotary assembly 1406 has an axis of rotation that is normal to the first plane. The rotary assembly 1410 couples the first arm to a second arm 1412. The second arm 1412 is mounted to a linear slide 1416. In an embodiment, the second arm 1412 is movable in a direction normal to the work surface 1418. It should be appreciated that the linear slide 1416 may also be arranged on an angle relative to the work surface 1418. A communication connection (e.g., an electrical wire) can be fed into and through the various components of the coordinate measuring device 1400 to enable control of the rotary assemblies 1403, 1404, 1406, 1410 and the laser line probe 1402. Although shown with the laser line probe 1402 attached to the rotary assemblies 1403, 1404, 1406, 1410, various other attached devices can be used without departing from the scope of the present disclosure.

Figure 15B:
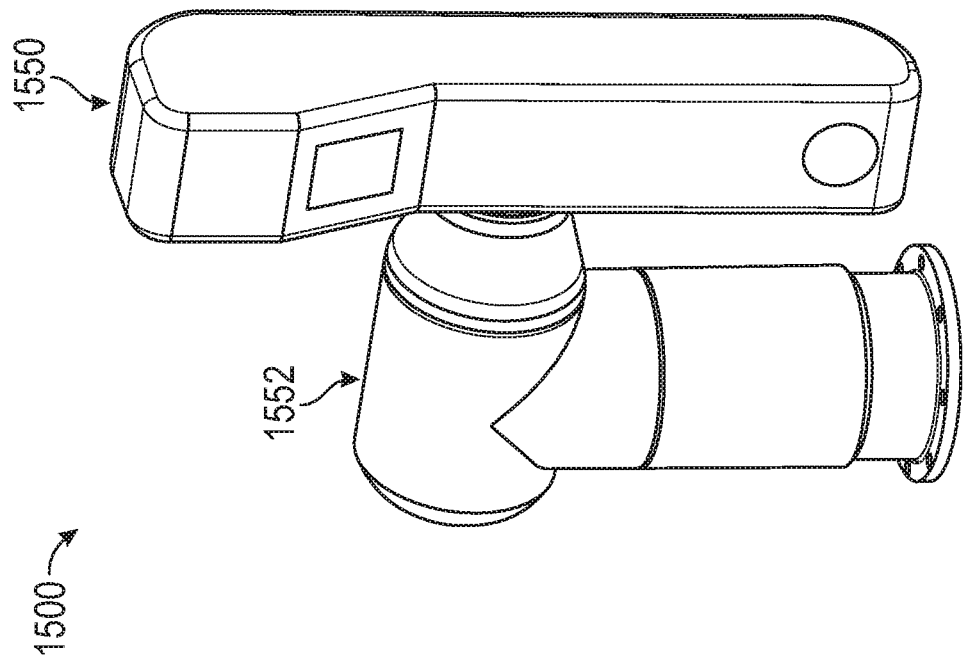
FIG. 15B is a schematic illustration of the coordinate measurement system of FIG. 15A with the parts thereof attached together.
Figure 15A:
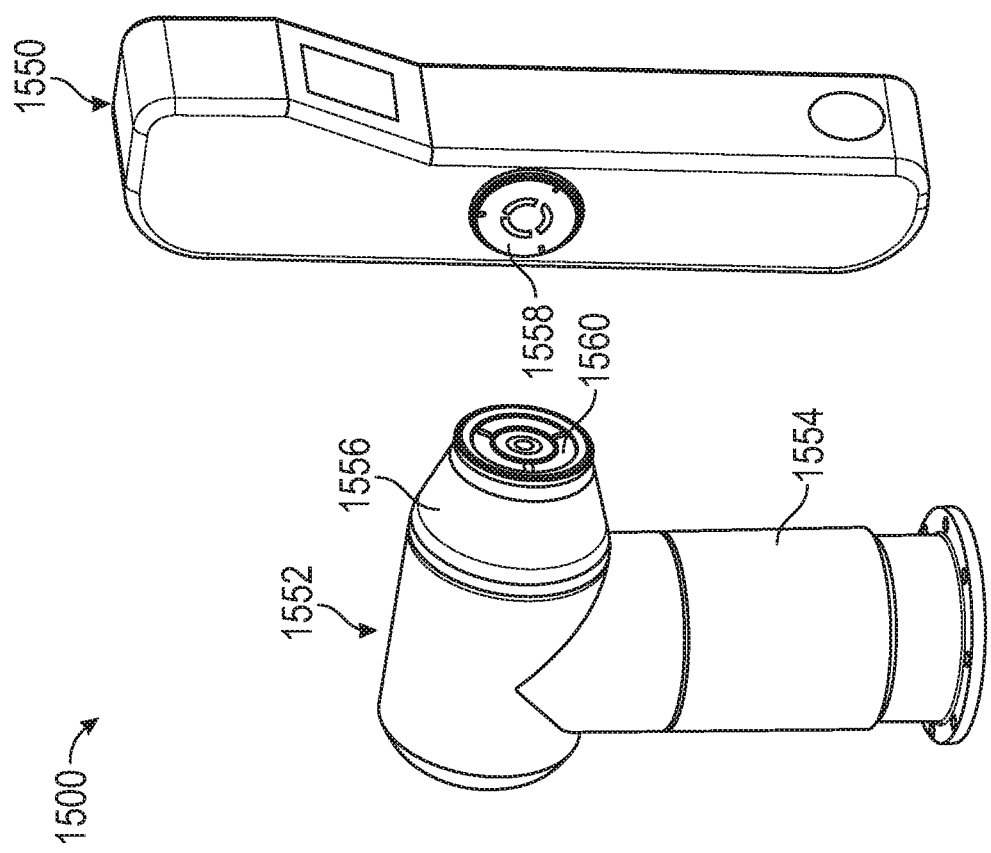
FIG. 15A is a schematic illustration of a coordinate measurement system in accordance with another embodiment of the present disclosure, wherein the parts thereof are separated.

Referring now to FIGS. 15A-15B, schematic illustrations of a coordinate measuring device 1500 is shown. The coordinate measuring device 1500 includes a laser line probe 1550 that is removably and movably mountable to a base 1552. As shown, the laser line probe 1550 is movably mounted to a motorized base 1552 that includes a first rotary assembly 1554 and a second rotary assembly 1556. The first and second rotary assemblies 1554, 1556 may be rotatable about axis that are arranged perpendicular to each other (although other angles of orientation are possible without departing from the scope of the present disclosure). A communication connection (e.g., an electrical wire) can be fed into and through the various components of the coordinate measuring device 1500 to enable control of the rotary assemblies 1554, 1556 and the laser line probe 1550. Although shown with the laser line probe 1550 attached to the rotary assemblies 1554, 1556, various other attached devices can be used without departing from the scope of the present disclosure.

The laser line probe 1550, having a first connector 1558, is releasably connectable to the base 1552, having a second connector 1560. FIG. 15A illustrates the laser line probe 1550 separated from the base 1552. FIG. 15B illustrates the laser line probe 1550 connected to the base 1552.

Figure 16:
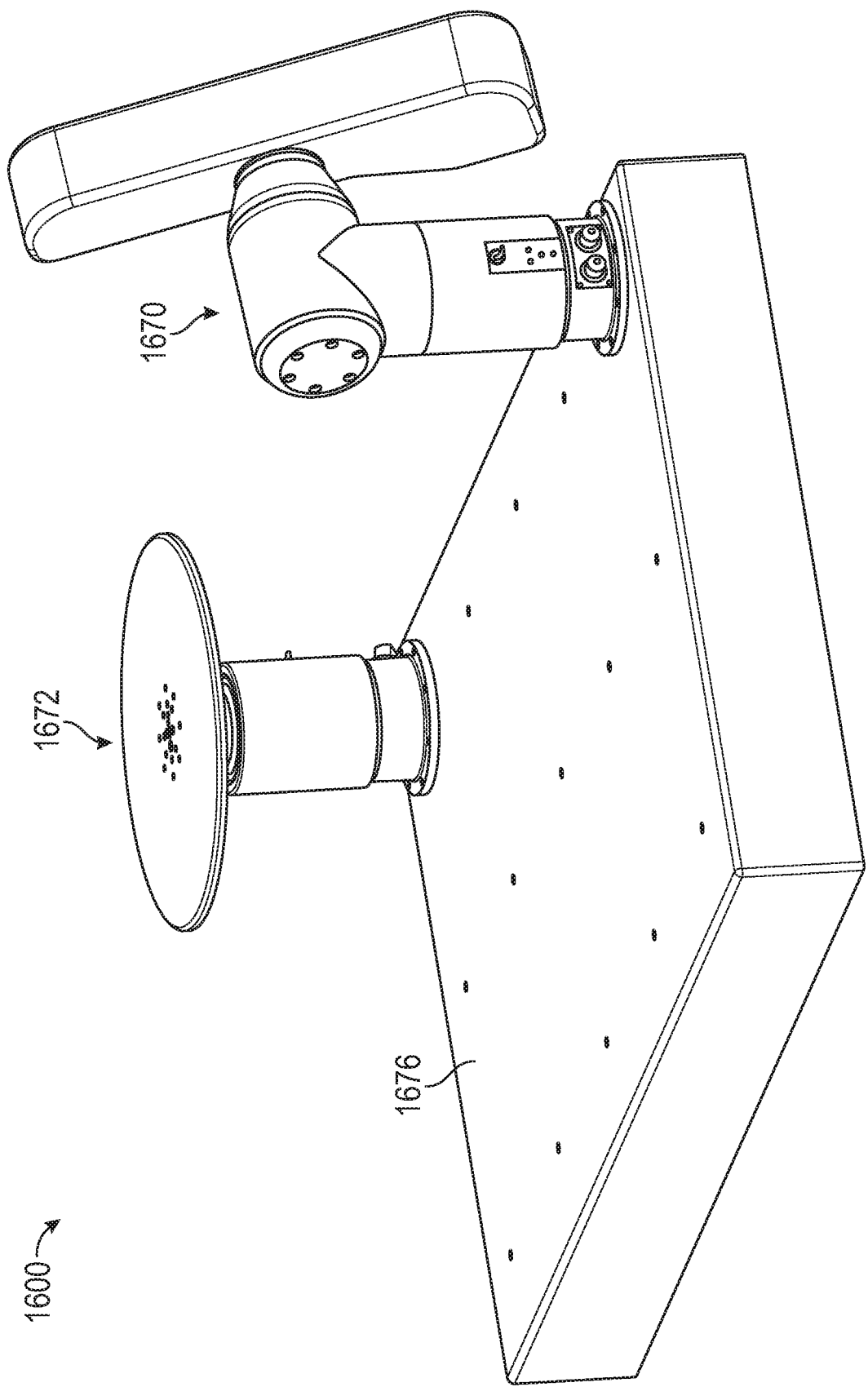
FIG. 16 is a perspective view of a coordinate measurement system in accordance with another embodiment of the present disclosure.

Turning now to FIG. 16, a schematic illustration of a coordinate measuring device 1600. The coordinate measuring device 1600 includes a first device 1670, similar to that shown and described with respect to FIGS. 15A-15B (e.g., a laser line probe mounted to a base), and a second device 1672. The first and second devices 1670, 1672 are mounted to a base 1674. In this embodiment, the first device 1672 may include one or more rotary assemblies of the present disclosure. The second device 1672, illustratively shown as a rotary table, can include one or more rotary assemblies of the present disclosure. Accordingly, multi-axis and remote-axis systems and configurations can employ various embodiments of the present disclosure and particularly incorporate rotary assemblies as shown and described above.

As described herein, the various rotary assemblies are operably connected to a control unit. Such connection, in some embodiments, may enable computer controlled operation and movement, and subsequent measurement by encoders that are part of the rotary assemblies. In some embodiments, when the motors are not used, the rotary assemblies may operate as traditional rotary assemblies (e.g., manually) without being hindered by the inclusion of the motor therein. Further, in some such embodiments, manual operation can enable a learning process to be performed such that a control unit or other control system can learn a manually input or controlled operation. Subsequently, the control unit or control system can control the elements of the system to automatically perform the manually input operation. Such learning can be based on encoder readings during a manual operation, may be based on currents, voltages, or other electrical characteristics within or associated with the motors of the rotary assemblies (e.g., measure current through windings to determine rotation of a shaft).

It will be appreciated that various of the rotary assemblies of embodiments of the present disclosure may be motorized or non-motorized. Furthermore, although a specific configuration for rotary assemblies are described herein, in some embodiments, the rotary assemblies may be in the form of cartridge or bearing-type rotary assemblies, such as those shown and described in aforementioned United States Patent Application 2018/0216923.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. An articulated arm coordinate measuring system comprising:
    a base;
    an articulated arm having at least a first arm segment, the first arm segment being rotationally coupled about a first axis and a second axis to the base;
    a coordinate measuring device coupled to an end of the articulated arm opposite the base;
    a rotary assembly coupled to the second axis, the rotary assembly comprising:
        a drive assembly having an output shaft passing therethrough, the drive assembly comprising:
            a motor subassembly; and
            an output subassembly having a gear assembly and a shaft engagement element,
            wherein the motor subassembly is configured to drive the gear assembly and the shaft engagement element to drive the output shaft; and
        a motor controller operably coupled to the motor subassembly, the motor assembly configured to provide a torque on the first arm segment about the second axis in response to a signal from the motor controller, the torque being adjusted to maintain the firm arm segment at a first position when a user removes their hand from the articulated arm.

2. The system of claim 1, wherein the motor controller is configured to adjust the torque in response to the application of an external force by an operator.

3. The system of claim 1, wherein the motor controller is configured to increase the torque in response to the reduction of an external force by an operator.

4. The system of claim 1, wherein the torque is based on a look up table.

5. The system of claim 1, further comprising a control unit operably connected to the motor subassembly and configured to control operation of the moto subassembly.

6. The system of claim 5, wherein the control unit is configured to learn manual input to automatically control operation of the subassembly motor based on learned manual input.

7. The system of claim 1, wherein the motor subassembly includes a stator and a rotor.

8. The system of claim 1, wherein the gear assembly comprises a strain wave gear set.

9. The system of claim 8, wherein the strain wave gear set includes a wave generator, a flex spline, and a circular spline.

10. The system of claim 9, wherein the flex spline operably connects to the shaft engagement element.

11. The system of claim 1, wherein the shaft engagement element is integrally formed with the output shaft.

12. The system of claim 1, wherein the shaft engagement element is fixedly connected to the output shaft.

13. The system of claim 1, wherein the shaft engagement element is an elastic element.

14. The system of claim 1, wherein the output shaft is an elastic element.

15. The system of claim 1, further comprising an output encoder element within the output subassembly and arranged to monitor at least one of position and rotation of at least one of the shaft engagement element and the output shaft.

16. The system of claim 1, further comprising a motor encoder element within the motor subassembly and arranged to monitor at least one of position and rotation of a component of the motor subassembly.

17. The system of claim 1, wherein the output subassembly includes an output housing arranged to house the motor subassembly and the output shaft.

18. The system of claim 1, further comprising an elastic element operably positioned between the gear assembly and the output shaft.

19. The system of claim 1, wherein the coordinate measuring device is a laser line probe.

20. An articulated arm coordinate measuring system comprising:
    a coordinate measuring device; and
    a rotary assembly comprising:
        a drive assembly having an output shaft passing therethrough, the drive assembly comprising:
            a motor subassembly;
            an output subassembly having a gear assembly and a shaft engagement element,
            wherein the motor subassembly is configured to drive the gear assembly and the shaft engagement element to drive the output shaft; and
        a control unit operably connected to the motor subassembly and configured to control operation of the subassembly motor, wherein the control unit is configured to learn manual input to automatically control operation of the subassembly motor based on the learned manual input.

21. The coordinate measuring system of claim 20, wherein the gear assembly comprises a strain wave gear set.

22. The coordinate measuring system of claim 20, wherein the gear assembly comprises a cycloidal drive.

23. The coordinate measuring system of claim 20, wherein the coordinate measuring device is a laser line probe.

24. The coordinate measuring system of claim 20, wherein the coordinate measuring device is a rotatable platter.

25. The coordinate measuring system of claim 20, wherein the motorized rotary assembly is a first motorized rotary assembly, the system further comprising a second motorized rotary assembly.

26. The coordinate measuring system of claim 25, wherein the first motorized rotary assembly is arranged to drive movement of a first coordinate measuring device and the second motorized rotary assembly is arranged to drive movement of a second coordinate measuring device.

27. The coordinate measuring system of claim 25, further comprising at least one control unit operably connected to the first motorized rotary assembly and the second motorized rotary assembly, the at least one control unit configured to control operation of the first and second motorized rotary assemblies.

28. The coordinate measuring system of claim 27, wherein the at least one control unit is a single control unit operably connected to both the first motorized rotary assembly and the second motorized rotary assembly.

29. The coordinate measuring system of claim 27, wherein the first motorized rotary assembly includes a first control unit and the second motorized rotary assembly includes a second control unit.

30. An articulated arm coordinate measuring system comprising:
   a first coordinate measuring device;
   a second coordinate measuring device;
   a first motorized rotary assembly configured to drive movement of the first coordinate measuring device; and
   a second motorized rotary assembly configured to drive movement of the second coordinate measuring device,
   wherein the first motorized rotary assembly comprises:
      a drive assembly having an output shaft passing therethrough, the drive assembly comprising:
      a motor subassembly; and
      an output subassembly having a gear assembly and a shaft engagement element, wherein the motor subassembly is configured to drive the gear assembly and the shaft engagement element to drive the output shaft.

* * * * *